US011856158B2

(12) United States Patent
Yamaguchi

(10) Patent No.: US 11,856,158 B2
(45) Date of Patent: Dec. 26, 2023

(54) ELECTRONIC APPARATUS, INFORMATION PROCESSING SYSTEM, AND INFORMATION PROCESSING METHOD

(71) Applicant: SHARP KABUSHIKI KAISHA, Sakai (JP)

(72) Inventor: Takeshi Yamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/966,690

(22) Filed: Oct. 14, 2022

(65) Prior Publication Data
US 2023/0128005 A1    Apr. 27, 2023

(30) Foreign Application Priority Data
Oct. 25, 2021   (JP) ................................ 2021-173675

(51) Int. Cl.
*H04N 1/00* (2006.01)
*H04N 1/32* (2006.01)

(52) U.S. Cl.
CPC ..... *H04N 1/00344* (2013.01); *H04N 1/00244* (2013.01); *H04N 1/32101* (2013.01); *H04N 2201/0094* (2013.01)

(58) Field of Classification Search
CPC .......... H04N 1/00344; H04N 1/00244; H04N 1/32101; H04N 2201/0094; H04N 1/00411

USPC ....................................................... 358/1.15
See application file for complete search history.

(56) References Cited

U.S. PATENT DOCUMENTS

| 9,648,109 B2 * | 5/2017 | Sugiyama ............... H04L 51/42 |
| 9,767,399 B2 * | 9/2017 | Yoshida ............. H04N 1/00344 |
| 2015/0264206 A1 | 9/2015 | Maeda |

FOREIGN PATENT DOCUMENTS

JP    2015174298 A    10/2015

* cited by examiner

*Primary Examiner* — Neil R McLean
(74) *Attorney, Agent, or Firm* — ScienBiziP, P.C.

(57) ABSTRACT

An electronic apparatus includes a storage that stores a personal address book; and a processor, wherein the personal address book includes a first personal address book associated with a first user, and a second personal address book associated with a second user, in a case where the first user updates and inputs first address information included in the first personal address book, the processor determines whether or not corresponding address information corresponding to the first address information is included in the second personal address book, and in a case where the corresponding address information is included in the second personal address book, the processor performs a notification process for asking the second user whether or not update of the corresponding address information is permitted, and in a case where a permission response is made to the notification process, the corresponding address information included in the second personal address book is updated.

10 Claims, 19 Drawing Sheets

FIG. 4

| ID | USER | NAME | TELEPHONE NUMBER | FAX NUMBER | EMAIL ADDRESS | ADDRESS |
|---|---|---|---|---|---|---|
| 101 | SHARE | AA TRADING | 98-7654 | 98-6666 | abc@aaa | 2-1, YY TOWN, XX CITY |
| 102 | SHARE | BB CONSTRUCTION | 76-5432 | 76-5555 | def@bbb | 40, ZZ TOWN, XX CITY |
| 103 | SHARE | CC STORE | 54-3210 | 54-3333 | ghi@ccc | 11, BB TOWN, AA CITY |
| 104 | SHARE | DD SCHOOL | 32-1098 | 32-1111 | jkl@ddd | 4-5, CC TOWN, AA CITY |
| 105 | SHARE | ... | | | | |
| 106 | SHARE | ... | | | | |
| 107 | SHARE | ... | | | | |
| 108 | SHARE | ... | | | | |

FIG. 5A

| ID | USER | NAME | TELEPHONE NUMBER | FAX NUMBER | EMAIL ADDRESS | ADDRESS |
|---|---|---|---|---|---|---|
| 201 | A | AKASAKA HAJIME | 12-3456 | 12-3000 | aaa@abc | 12, FF TOWN, XX CITY |
| 202 | A | ISHIBASI JIRO | 34-5678 | 34-5000 | bbb@abc | 5-5, ZZ TOWN, XX CITY |
| 203 | A | UMEDA SANJI | 56-7890 | 56-7000 | ccc@def | 16, ZZ TOWN, XX CITY |
| 204 | A | ETOH SHINOBU | 78-9012 | 78-9000 | ddd@ghi | 3, DD TOWN, XX CITY |
| 205 | A | ... | | | | |
| 206 | A | ... | | | | |
| 207 | A | ... | | | | |
| 208 | A | ... | | | | |

FIG. 5B

| ID | USER | NAME | TELEPHONE NUMBER | FAX NUMBER | EMAIL ADDRESS | ADDRESS |
|---|---|---|---|---|---|---|
| 301 | B | MR./MS. ASAI | 55-6666 | 55-5555 | xxx@abc | 20, FF TOWN, XX CITY |
| 302 | B | MR./MS. ISHIBASHI | 34-5678 | 34-5000 | bbb@abc | 5-5, ZZ TOWN, XX CITY |
| 303 | B | MR./MS. UDA | 77-8888 | 77-9999 | kkk@opq | 33, ZZ TOWN, XX CITY |
| 304 | B | MR./MS. SAKAI | 99-0000 | 99-0123 | zzz@wxy | 45, CC TOWN, AA CITY |
| 305 | B | ... | | | | |
| 306 | B | ... | | | | |
| 307 | B | ... | | | | |
| 308 | B | ... | | | | |

FIG. 6

| USER ID | USER NAME | PASSWORD | CONTACT ADDRESS |
|---------|-----------|----------|-----------------|
| 100001 | A | XXXX | email:aaa@nnn |
| 100002 | B | XXXXXXXX | email:qqq@nnn |
| 100003 | C | XXXXXXXX | email:ppp@nnn |
| 100004 | D | XXXX | email:zzz@nnn |
| 100005 | ... | | |
| 100006 | ... | | |
| 100007 | ... | | |
| 100008 | ... | | |

FIG. 8

| ID | USER | NAME | TELEPHONE NUMBER | FAX NUMBER | EMAIL ADDRESS | ADDRESS |
|---|---|---|---|---|---|---|
| 101 | SHARE | AA TRADING | 98-7654 | 98-6666 | abc@aaa | 2-1, YY TOWN, XX CITY |
| 102 | SHARE | BB CONSTRUCTION | 76-5432 | 76-5555 | def@bbb | 40, ZZ TOWN, XX CITY |
| 103 | SHARE | CC STORE | 54-3210 | 54-3333 | ghi@ccc | 11, BB TOWN, AA CITY |
| 104 | SHARE | DD SCHOOL | 32-1098 | 32-1111 | jkl@ddd | 4-5, CC TOWN, AA CITY |
| 105 | SHARE | ... | | | | |
| 106 | SHARE | ... | | | | |
| 107 | SHARE | ... | | | | |
| 108 | SHARE | ... | | | | |
| 201 | A | AKASAKA HAJIME | 12-3456 | 12-3000 | aaa@abc | 12, FF TOWN, XX CITY |
| 202 | A | ISHIBASI JIRO | 34-5678 | 34-5000 | bbb@abc | 5-5, ZZ TOWN, XX CITY |
| 203 | A | UMEDA SANJI | 56-7890 | 56-7000 | ccc@def | 16, ZZ TOWN, XX CITY |
| 204 | A | ETOH SHINOBU | 78-9012 | 78-9000 | ddd@ghi | 3, DD TOWN, XX CITY |
| 205 | A | ... | | | | |
| 206 | A | ... | | | | |
| 207 | A | ... | | | | |
| 208 | A | ... | | | | |

FIG. 9

| ID | USER | NAME | TELEPHONE NUMBER | FAX NUMBER | EMAIL ADDRESS | ADDRESS |
|---|---|---|---|---|---|---|
| 101 | SHARE | AA TRADING | 98-7654 | 98-6666 | abc@aaa | 2-1, YY TOWN, XX CITY |
| 102 | SHARE | BB CONSTRUCTION | 76-5432 | 76-5555 | def@bbb | 40, ZZ TOWN, XX CITY |
| 103 | SHARE | CC STORE | 54-3210 | 54-3333 | ghi@ccc | 11, BB TOWN, AA CITY |
| 104 | SHARE | DD SCHOOL | 32-1098 | 32-1111 | jkl@ddd | 4-5, CC TOWN, AA CITY |
| 105 | SHARE | ... | | | | |
| 106 | SHARE | ... | | | | |
| 107 | SHARE | ... | | | | |
| 108 | SHARE | ... | | | | |
| 201 | A | AKASAKA HAJIME | 12-3456 | 12-3000 | aaa@abc | 12, FF TOWN, XX CITY |
| 202 | A | ISHIBASI JIRO | 66-7890 | 66-7000 | bbb@abc | 6-3, ZZ TOWN, XX CITY |
| 203 | A | UMEDA SANJI | 56-7890 | 56-7000 | ccc@def | 16, ZZ TOWN, XX CITY |
| 204 | A | ETOH SHINOBU | 78-9012 | 78-9000 | ddd@ghi | 3, DD TOWN, XX CITY |
| 205 | A | ... | | | | |
| 206 | A | ... | | | | |
| 207 | A | ... | | | | |
| 208 | A | ... | | | | |

FIG. 11

| ID | USER | NAME | TELEPHONE NUMBER | FAX NUMBER | EMAIL ADDRESS | ADDRESS | |
|---|---|---|---|---|---|---|---|
| 101 | SHARE | AA TRADING | 98-7654 | 98-6666 | abc@aaa | 2-1, YY TOWN, XX CITY | |
| 102 | SHARE | BB CONSTRUCTION | 76-5432 | 76-5555 | def@bbb | 40, ZZ TOWN, XX CITY | |
| 103 | SHARE | CC STORE | 54-3210 | 54-3333 | ghi@ccc | 11, BB TOWN, AA CITY | |
| 104 | SHARE | DD SCHOOL | 32-1098 | 32-1111 | jkl@ddd | 4-5, CC TOWN, AA CITY | |
| 105 | SHARE | ... | | | | | |
| 106 | SHARE | ... | | | | | |
| 107 | SHARE | ... | | | | | |
| 108 | SHARE | ... | | | | | |
| 201 | A | AKASAKA HAJIME | 12-3456 | 12-3000 | aaa@abc | 12, FF TOWN, XX CITY | |
| 202 | A | ISHIBASI JIRO | 34-5678 | 34-5000 | bbb@abc | 5-5, ZZ TOWN, XX CITY | ← COMPARISON SOURCE |
| 203 | A | UMEDA SANJI | 56-7890 | 56-7000 | ccc@def | 16, ZZ TOWN, XX CITY | |
| 204 | A | ETOH SHINOBU | 78-9012 | 78-9000 | ddd@ghi | 3, DD TOWN, XX CITY | |
| 205 | A | ... | | | | | |
| 206 | A | ... | | | | | |
| 207 | A | ... | | | | | |
| 208 | A | ... | | | | | |
| 301 | B | MR./MS. ASAI | 55-6666 | 55-5555 | xxx@abc | 20, FF TOWN, XX CITY | |
| 302 | B | MR./MS. ISHIBASHI | 34-5678 | 34-5000 | bbb@abc | 5-5, ZZ TOWN, XX CITY | ← 4 MATCHING ITEMS ARE FOUND |
| 303 | B | MR./MS. UDA | 77-8888 | 77-9999 | kkk@opq | 33, ZZ TOWN, XX CITY | |
| 304 | B | MR./MS. SAKAI | 99-0000 | 99-0123 | zzz@wxy | 45, CC TOWN, AA CITY | |
| 305 | B | ... | | | | | |
| 306 | B | ... | | | | | |
| 307 | B | ... | | | | | |
| 308 | B | ... | | | | | |

FIG. 12

```
TO: MR./MS. B <qqq@nnn>
Subject: ADDRESS CHANGE

MR./MS. A DISCLOSED FOLLOWING ADDRESS CHANGE.
WILL YOU REFLECT CHANGE?
```

| NAME | TELEPHONE NUMBER | FAX NUMBER | EMAIL ADDRESS | ADDRESS |
|---|---|---|---|---|
| MR./MS. ISHIBASHI | 34-5678 | 34-5000 | bbb@abc | 5-5, ZZ TOWN, XX CITY |
| MR./MS. ISHIBASHI | 66-7890 | 66-7000 | bbb@abc | 6-3, ZZ TOWN, XX CITY |

| OK | WITHHOLD | UNNECESSARY | IGNORE FROM NOW ON |
|---|---|---|---|

FIG. 15A

| FOLLOWING ADDRESS BOOK CONTENT CHANGE IS REFLECTED ||||||
|---|---|---|---|---|
| NAME | TELEPHONE NUMBER | FAX NUMBER | EMAIL ADDRESS | ADDRESS |
| MR./MS. ISHIBASHI | 34-5678 | 34-5000 | bbb@abc | 5-5, ZZ TOWN, XX CITY |
| MR./MS. ISHIBASHI | 66-7890 | 66-7000 | bbb@abc | 6-3, ZZ TOWN, XX CITY |

FIG. 15B

| FOLLOWING ADDRESS BOOK CONTENT CHANGE CONFIRMATION WILL BE NOTIFIED AGAIN IN XX MINUTES ||||||
|---|---|---|---|---|
| NAME | TELEPHONE NUMBER | FAX NUMBER | EMAIL ADDRESS | ADDRESS |
| MR./MS. ISHIBASHI | 34-5678 | 34-5000 | bbb@abc | 5-5, ZZ TOWN, XX CITY |
| MR./MS. ISHIBASHI | 66-7890 | 66-7000 | bbb@abc | 6-3, ZZ TOWN, XX CITY |

FIG. 15C

| FOLLOWING ADDRESS BOOK CONTENT IS KEPT ||||||
|---|---|---|---|---|
| NAME | TELEPHONE NUMBER | FAX NUMBER | EMAIL ADDRESS | ADDRESS |
| MR./MS. ISHIBASHI | 34-5678 | 34-5000 | bbb@abc | 5-5, ZZ TOWN, XX CITY |

FIG. 15D

| FOLLOWING ADDRESS BOOK CONTENT IS KEPT ||||||
|---|---|---|---|---|
| NAME | TELEPHONE NUMBER | FAX NUMBER | EMAIL ADDRESS | ADDRESS |
| MR./MS. ISHIBASHI | 34-5678 | 34-5000 | bbb@abc | 5-5, ZZ TOWN, XX CITY |

CHANGE IN MR/MS. A'S ADDRESS BOOK IS NOT NOTIFIED OR REFLECTED FROM NOW ON

FIG. 16A

| USER ID | CHANGE DESTINATION USER | CHANGE SOURCE USER |
|---|---|---|
| 100001 | A | NONE |
| 100002 | B | NONE |
| 100003 | C | NONE |
| 100004 | D | NONE |
| 100005 | ... | |
| 100006 | ... | |
| 100007 | ... | |
| 100008 | ... | |

FIG. 16B

| USER ID | CHANGE DESTINATION USER | CHANGE SOURCE USER |
|---|---|---|
| 100001 | A | NONE |
| 100002 | B | A |
| 100003 | C | NONE |
| 100004 | D | NONE |
| 100005 | ... | |
| 100006 | ... | |
| 100007 | ... | |
| 100008 | ... | |

FIG. 17

| ID | USER | NAME | TELEPHONE NUMBER | FAX NUMBER | EMAIL ADDRESS | ADDRESS | ADMINISTRATOR | USED HISTORY |
|---|---|---|---|---|---|---|---|---|
| 101 | SHARE | AA TRADING | 98-7654 | 96-6666 | abc@aaa | 2-1, YY TOWN, XX CITY | P | A |
| 102 | SHARE | BB CONSTRUCTION | 76-5432 | 76-5555 | def@bbb | 40, ZZ TOWN, XX CITY | Q | B,C |
| 103 | SHARE | CC STORE | 54-3210 | 54-3333 | ghi@ccc | 11, BB TOWN, AA CITY | Q | A,B |
| 104 | SHARE | DD SCHOOL | 32-1098 | 32-1111 | jkl@ddd | 4-5, CC TOWN, AA CITY | Q | D |
| 105 | SHARE | ... | | | | | | |
| 106 | SHARE | ... | | | | | | |
| 107 | SHARE | ... | | | | | | |
| 108 | SHARE | ... | | | | | | |

FIG. 18

| ID | USER | NAME | TELEPHONE NUMBER | FAX NUMBER | EMAIL ADDRESS | ADDRESS | SHARED RANGE |
|---|---|---|---|---|---|---|---|
| 201 | A | AKASAKA HAJIME | 12-3456 | 12-3000 | aaa@abc | 12, FF TOWN, XX CITY | IN SECTION |
| 202 | A | ISHIBASI JIRO | 34-5678 | 34-5000 | bbb@abc | 5-5, ZZ TOWN, XX CITY | IN OFFICE |
| 203 | A | UMEDA SANJI | 56-7890 | 56-7000 | ccc@def | 16, ZZ TOWN, XX CITY | IN DIVISION |
| 204 | A | ETOH SHINOBU | 78-9012 | 78-9000 | ddd@ghi | 3, DD TOWN, XX CITY | IN DEPARTMENT |
| 205 | A | ... | | | | | |
| 206 | A | ... | | | | | |
| 207 | A | ... | | | | | |
| 208 | A | ... | | | | | |

FIG. 19

| ID  | USER  | NAME             | TELEPHONE NUMBER | FAX NUMBER | EMAIL ADDRESS | ADDRESS              |
|-----|-------|------------------|------------------|------------|---------------|----------------------|
| 101 | SHARE | AA TRADING       | 98-7654          | 98-6666    | abc@aaa       | 2-1, YY TOWN, XX CITY |
| 102 | SHARE | BB CONSTRUCTION  | 76-5432          | 76-5555    | def@bbb       | 40, ZZ TOWN, XX CITY  |
| 103 | SHARE | CC STORE         | 54-3210          | 54-3333    | ghi@ccc       | 11, BB TOWN, AA CITY  |
| 104 | SHARE | DD SCHOOL        | 32-1098          | 32-1111    | jkl@ddd       | 4-5, CC TOWN, AA CITY |
| 105 | SHARE | ...              |                  |            |               |                      |
| 106 | SHARE | ...              |                  |            |               |                      |
| 107 | SHARE | ...              |                  |            |               |                      |
| 108 | SHARE | ...              |                  |            |               |                      |
| 301 | B     | MR./MS. ASAI     | 55-6666          | 55-5555    | xxx@abc       | 20, FF TOWN, XX CITY  |
| 302 | B     | MR./MS. ISHIBASHI| 34-5678          | 34-5000    | bbb@abc       | 5-5, ZZ TOWN, XX CITY |
| 303 | B     | MR./MS. UDA      | 77-8888          | 77-9999    | kkk@opq       | 33, ZZ TOWN, XX CITY  |
| 304 | B     | MR./MS. SAKAI    | 99-0000          | 99-0123    | zzz@wxy       | 45, CC TOWN, AA CITY  |
| 305 | B     | ...              |                  |            |               |                      |
| 306 | B     | ...              |                  |            |               |                      |
| 307 | B     | ...              |                  |            |               |                      |
| 308 | B     | ...              |                  |            |               |                      |

↓ SELECTION OPERATION

MR./MS. A DISCLOSED FOLLOWING ADDRESS CHANGE. WILL YOU REFLECT CHANGE? — 140

| NAME              | TELEPHONE NUMBER | FAX NUMBER | EMAIL ADDRESS | ADDRESS               |
|-------------------|------------------|------------|---------------|-----------------------|
| MR./MS. ISHIBASHI | 34-5678          | 34-5000    | bbb@abc       | 5-5, ZZ TOWN, XX CITY |
| MR./MS. ISHIBASHI | 66-7890          | 66-7000    | bbb@abc       | 6-3, ZZ TOWN, XX CITY |

| OK | WITHHOLD | UNNECESSARY | IGNORE FROM NOW ON |

FIG. 20A

| USER ID | CHANGE DESTINATION USER | CHANGE SOURCE USER |
|---|---|---|
| 100001 | A | NONE |
| 100002 | B | NONE |
| 100003 | C | NONE |
| 100004 | D | NONE |
| 100005 | ... | |
| 100006 | ... | |
| 100007 | ... | |
| 100008 | ... | |

FIG. 20B

| USER ID | CHANGE DESTINATION USER | CHANGE SOURCE USER |
|---|---|---|
| 100001 | A | NONE |
| 100002 | B | NONE |
| 100003 | C | A |
| 100004 | D | NONE |
| 100005 | ... | |
| 100006 | ... | |
| 100007 | ... | |
| 100008 | ... | |

ELECTRONIC APPARATUS, INFORMATION PROCESSING SYSTEM, AND INFORMATION PROCESSING METHOD

CROSS-REFERENCE TO RELATED APPLICATION

The present application claims priority from Japanese Application JP2021-173675, the content of which is hereby incorporated by reference into this application.

BACKGROUND OF THE DISCLOSURE

1. Field of the Invention

The present disclosure relates to an electronic apparatus, an information processing system, an information processing method, and the like.

2. Description of the Related Art

Conventionally, there are known various methods for managing an address book used in an image forming apparatus or the like. For example, a conventional technology discloses an image forming apparatus that determines whether to reflect a personal setting value or a shared setting value depending on a login status of a user. The personal setting value includes a personal address book, and the shared setting value includes a personal address book.

SUMMARY

The above conventional technology is a method which assumes use by switching between a shared address book and a user's personal address book, and there is no disclosure as to how to efficiently change personal address books of a plurality of users.

According to some aspects of the present disclosure, it is possible to provide an electronic apparatus, an information processing system, an information processing method, and the like to properly share the contents of change in an address book.

An aspect of the present disclosure relates to an electronic apparatus including: a storage that stores a personal address book; and a processor, wherein the personal address book includes a first personal address book associated with a first user, and a second personal address book associated with a second user, in a case where the first user updates and inputs first address information included in the first personal address book, the processor determines whether or not corresponding address information corresponding to the first address information is included in the second personal address book, and in a case where the corresponding address information is included in the second personal address book, the processor performs a notification process for asking the second user whether or not update of the corresponding address information is permitted, and in a case where a permission response is made to the notification process, the corresponding address information included in the second personal address book is updated.

Another aspect of the present disclosure relates to an information processing system including: a first image forming apparatus; a second image forming apparatus; and a server system that executes a process for a personal address book, wherein the personal address book includes a first personal address book associated with a first user, and a second personal address book associated with a second user, in a case where the first user updates and inputs first address information included in the first personal address book in the first image forming apparatus, the server system determines whether or not corresponding address information corresponding to the first address information is included in the second personal address book, in a case where the corresponding address information is included in the second personal address book, the server system performs a notification process for asking the second user whether or not update of the corresponding address information is permitted, and in a case where a permission response is made to the notification process, the corresponding address information included in the second personal address book is updated, and the second personal address book after update is transmitted to the second image forming apparatus.

Yet another aspect of the present disclosure relates to an information processing method for performing a process to a personal address book, the personal address book including a first personal address book associated with a first user, and a second personal address book associated with a second user, the information processing method including: determining whether or not corresponding address information corresponding to first address information is included in the second personal address book in a case where the first user updates and inputs the first address information included in the first personal address book; and performing a notification process for asking the second user whether or not update of the corresponding address information is permitted in a case where the corresponding address information is included in the second personal address book, and updating the corresponding address information included in the second personal address book in a case where a permission response is made to the notification process.

BRIEF DESCRIPTION OF THE DRAWINGS

FIG. 4 is an example of a shared address book.

FIG. 5A is an example of a personal address book.

FIG. 5B is an example of the personal address book.

FIG. 6 is an example of an authentication data.

FIG. 8 is an example of data used for a display process for a user A as a target.

FIG. 9 is an example of a change content by the user A.

FIG. 11 is a diagram illustrating a process for searching corresponding address information.

FIG. 12 is an example of a mail used for a notification process to an other user.

FIG. 15A is an example of a Web display screen in a case where a permission response is made.

FIG. 15B is an example of a Web display screen in a case where a withholding response is made.

FIG. 15C is an example of a Web display screen in a case where a rejection response is made.

FIG. 15D is an example of a Web display screen in a case where an ignoring designation response is made.

FIG. 16A is an example of an ignoring target list.

FIG. 16B is an example of the ignoring target list.
FIG. 17 is another example of the shared address book.
FIG. 18 is another example of the personal address book.
FIG. 19 is another example of the notification process.
FIG. 20A is an example of an approval target list.
FIG. 20B is an example of the approval target list.

DETAILED DESCRIPTION OF THE DISCLOSURE

Figure 1:
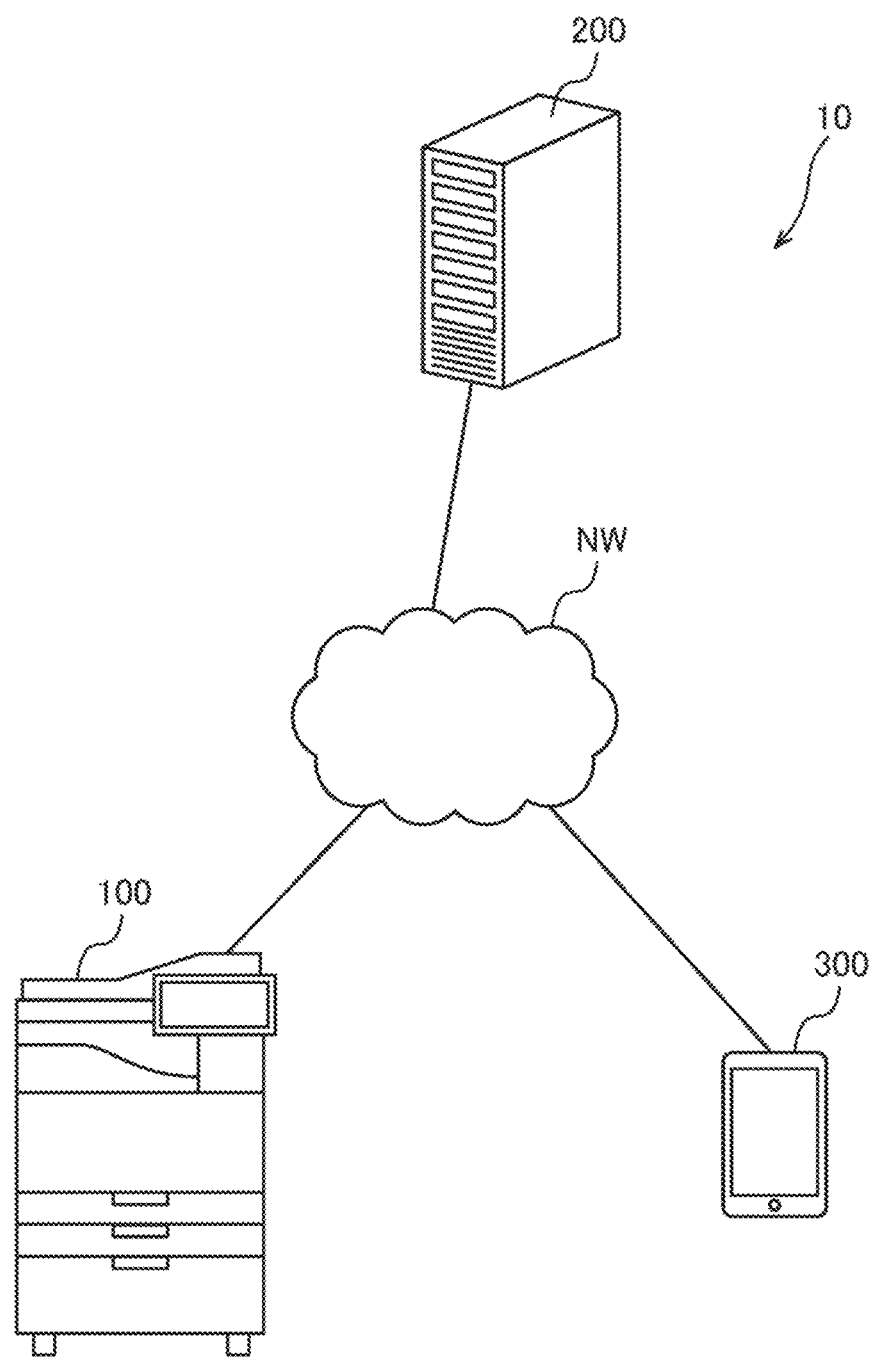
FIG. 1 is a configuration example of an information processing system.

Hereinafter, this embodiment will be described with reference to the drawings. In the drawings, the same or equivalent elements are given the same reference numerals and duplicate description will be omitted. This embodiment described below does not unreasonably limit the content described in the scope of claims. In addition, not all of configurations described in this embodiment are essential configuration requirements for the present disclosure.

1. System Configuration Example

Figure 2:
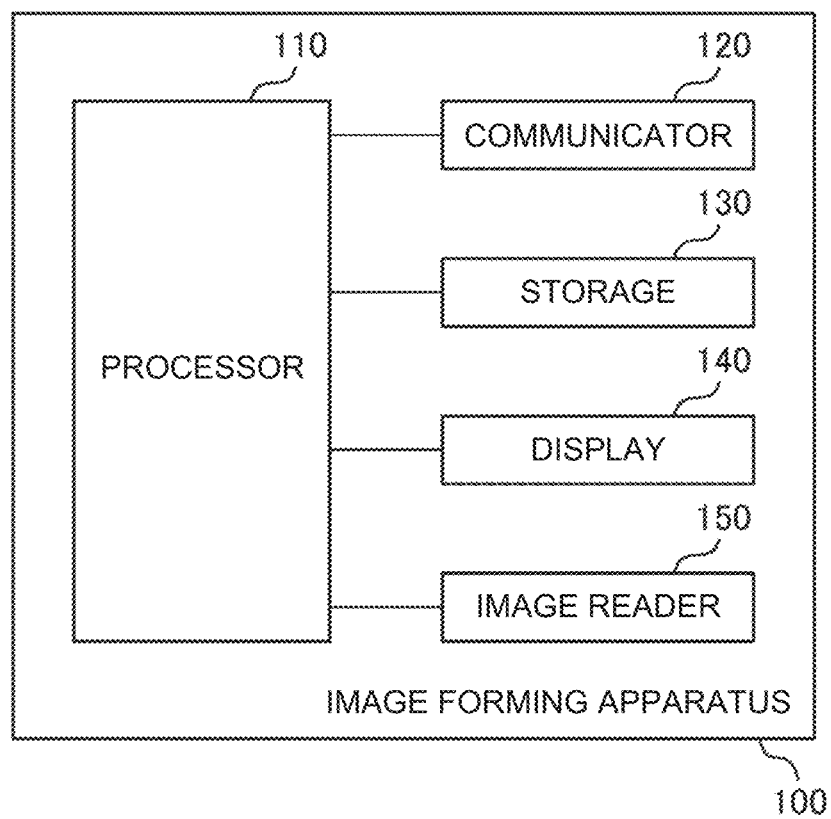
FIG. 2 is a configuration example of an image forming apparatus.
Figure 3:
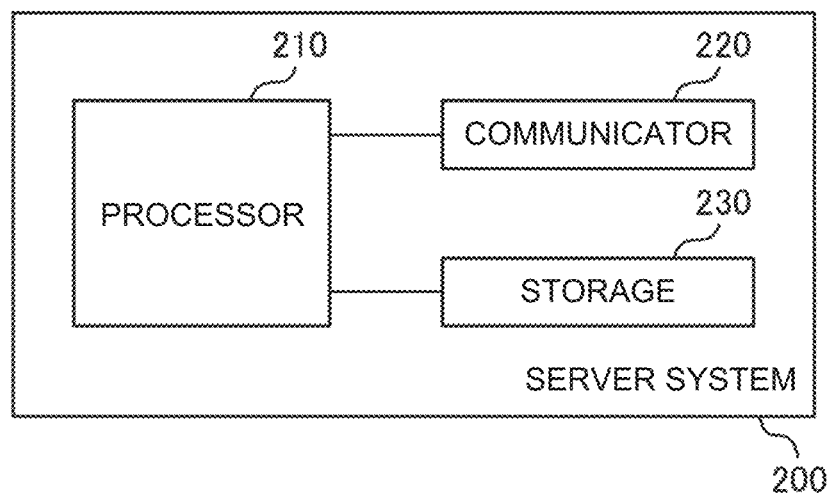
FIG. 3 is a configuration example of a server system.

FIG. 1 is a diagram illustrating a configuration of an information processing system 10 including an electronic apparatus according to this embodiment. As illustrated in FIG. 1, the information processing system 10 according to this embodiment includes an image forming apparatus 100, a server system 200, and a terminal device 300. The image forming apparatus 100 is, for example, an MFP (Multifunction Peripheral). An apparatus other than the MFP may be used as the image forming apparatus. The system configuration is not limited to that in FIG. 1, and various modifications such as partial omission of the configuration and addition of other configurations are possible. FIG. 2, FIG. 3, and the like, which will be described later, are the same as FIG. 1 in that modifications such as omission and addition are possible.

The electronic apparatus in this embodiment may be the image forming apparatus 100, or may be the server system 200. The electronic apparatus may be implemented by a plurality of devices including the image forming apparatus 100 and the server system 200. That is, the processor of the electronic apparatus may be a processor 110 of the image forming apparatus 100 described later using FIG. 2, may be a processor 210 of the server system 200 described later using FIG. 3, or may be both the processors. Similarly, a storage of the electronic apparatus may be a storage 130 of the image forming apparatus 100 described later using FIG. 2, may be a storage 230 of the server system 200 described later using FIG. 3, or may be both the processors. In a case where the electronic apparatus is the image forming apparatus 100, the server system 200 may be omitted from the system according to this embodiment.

In order to simplify the description, an example in which the electronic apparatus in this embodiment is the server system 200 will be hereinafter mainly described. In the following description, a process executed by the server system 200 may be executed by the image forming apparatus 100, or may be executed by a distributed process between the image forming apparatus 100 and the server system 200.

The image forming apparatus 100 is, for example, an apparatus including at least one of a printing function and a scanning function. The image forming apparatus 100 may be a printer with a printing function, may be a scanner with a scanning function, may have both the functions. That is, the image forming apparatus 100 according to this embodiment may be an image forming apparatus or an image processing apparatus. In addition, the image forming apparatus 100 may be a device having other function such as a facsimile function and a copy function.

The server system 200 may be composed of one server or may be composed of a plurality of servers. For example, the server system 200 may include a database server for storing a shared address book and a personal address book, and a processing server for address management including a change process of the personal address book. The server herein may represent a physical server or may represent a virtual server. Also, a plurality of servers may be distributed and disposed, and the specific configuration of the server system 200 can be modified in various manners.

The terminal device 300 is a device provided for each user who uses the information processing system 10 according to this embodiment, and is a portable terminal device such as a smartphone, for example. The terminal device 300 may be a PC (Personal Computer), may be a tablet terminal, or may be a wearable device. Specific aspects can be modified in various manners.

The image forming apparatus 100, the server system 200, and the terminal device 300 are connected to a network NW. The network NW herein is, for example, a public communication network such as the Internet. The network NW may be an intranet or the like, and specific aspects can be modified in various manners. The image forming apparatus 100 and the server system 200, the server system 200 and the terminal device 300, the image forming apparatus 100 and the terminal device 300 may be able to communicate via the network NW.

For example, the image forming apparatus 100 is an apparatus used in an organization such as a company. The image forming apparatus 100 may be an apparatus located in an office or the like and shared by members of the organization. The server system 200 is an apparatus for managing an address book of an organization. The server system 200 may be managed in the organization or provided by an external service provider. The terminal device 300 is an apparatus used by a member of an organization. It is assumed that there are a plurality of members herein. Therefore, although one terminal device 300 is illustrated in FIG. 1 for convenience, the information processing system 10 may include a plurality of the terminal devices 300. In addition, depending on the scale of the organization, the image forming apparatus 100 may be provided on each floor of an office, or a plurality of the image forming apparatuses 100 may be provided on one floor. Accordingly, although one image forming apparatus 100 is illustrated in FIG. 1 for convenience, the information processing system 10 may include a plurality of the image forming apparatuses 100. An example in which a plurality of the image forming apparatuses 100 are included will be described later with reference to FIG. 21.

FIG. 2 is a diagram illustrating a configuration example of the image forming apparatus 100. The image forming apparatus 100 includes the processor 110, a communicator 120, the storage 130, a display 140, and an image reader 150. However, the image forming apparatus 100 may have a printing function and the like, and may include, for example, a printing unit (not illustrated).

The processor 110 are composed of the following hardware. The hardware may include at least one of a circuit that processes a digital signal and a circuit that processes an analog signal. For example, hardware can be composed of one or more circuit devices or one or more circuit elements mounted on a circuit board. One or more circuit devices are, for example, ICs (Integrated Circuits), FPGAs (field-programmable gate arrays), and the like. One or more circuit elements are, for example, resistors, capacitors, and the like.

The processor 110 may also be implemented by the following processor. The image forming apparatus 100 of this embodiment includes a memory that stores information and a processor that operates on the basis of the information stored in the memory. The information is, for example, programs and various data. The processor includes hardware. The processor can use various processors such as a CPU (Central Processing Unit), a GPU (Graphics Processing Unit), and a DSP (Digital Signal Processor). The memory may be a semiconductor memory such as a SRAM (Static Random Access Memory) and a DRAM (Dynamic Random Access Memory), may be a register, may be a magnetic storage device such as an HDD (Hard Disk Drive), or may be an optical storage device such as an optical disk device. For example, the memory stores an instruction that can be read by the computer, and the function of the processor 110 is realized as a process by execution of the instruction by the processor. The instruction herein may be an instruction of an instruction set composed of the program, or may be an instruction that instructs a hardware circuit of the processor to operate.

The processor 110 controls each unit of the image forming apparatus 100 illustrated in FIG. 2. For example, the processor 110 executes communication control, data read and write control, display control, and the like. In addition, the processor 110 may execute print control, scan control, facsimile transmission/reception control, and the like.

The communicator 120 is an interface for performing communication via the network. The image forming apparatus 100 is connected to the network NW through the communicator 120. The communicator 120 includes, for example, an antenna, a radio frequency (RF) circuit, and a baseband circuit. The communicator 120 operates in accordance with control by the processor 110. In addition, the communicator 120 may include a processor for communication control different from the processor 110. The communicator 120 may be, for example, an interface that performs communication in accordance with IEEE802.11, and more specifically, performs communication in accordance with Wi-Fi (registered trademark). However, the communicator 120 may be a communication interface that performs wireless communication of another method, or may be a communication interface that performs wired connection. The image forming apparatus 100 of this embodiment may be capable of performing communication by facsimile. For example, the communicator 120 may include a telephone line connection unit for performing communication using a public switched telephone network. The communicator 120 of this embodiment may include any one of connection units with different communication methods such as a wireless LAN connection unit, a wired LAN connection unit, and a telephone line connection unit, or may include two or more of these.

The storage 130 is a work area of the processor 110 and stores various information. The storage 130 can be realized by various types of memories, and the memory may be a semiconductor memory, a register, a magnetic storage device, or an optical storage device.

The display 140 is a display that displays video information. The display 140 can be realized by, for example, a liquid crystal display or an organic EL display. The display 140 may be a UI (User Interface) when using the functions of the image forming apparatus 100, such as the print function and the scan function.

The image reader 150 corresponds to, for example, a scan function, reads a document, and acquires an image that is the result of reading. The image reader includes, for example, a transport unit that transports a document to be read, a light source unit that irradiates the document on a transport path with light, and a light receiving unit that receives light reflected by the document. The transport unit includes, for example, transport rollers. The light source unit is a light emitting element such as an LED (light emitting diode). The light receiving unit is a photoelectric conversion element such as a PD (Photodiode). The image reader is not limited to a unit that transports a document, and may include a mechanism for driving a light source unit and a light receiving unit. The image reader acquires an image on the basis of a detection result in the light receiving unit.

FIG. 3 is a diagram illustrating a configuration example of the server system 200. The server system 200 includes the processor 210, a communicator 220, and the storage 230.

The processor 210 is composed of hardware including at least one of a circuit for processing a digital signal and a circuit for processing an analog signal. For example, hardware can be composed of one or more circuit devices or one or more circuit elements mounted on a circuit board.

The processor 210 may be implemented by various processors such as a CPU, a GPU, and a DSP. The server system 200 of this embodiment includes a memory that stores information and a processor that operates on the basis of the information stored in the memory. For example, the memory stores an instruction that can be read by the computer, and the function of the processor 210 is realized as a process by execution of the instruction by the processor.

The processor 210 controls each unit of the server system 200 illustrated in FIG. 3. For example, the processor 210 executes communication control, and data read and write control. In addition, the processor 210 may execute a management process of an address book. The details of the management process will be described below.

The communicator 220 is an interface for performing communication via the network. The server system 200 is connected to the network NW through the communicator 220. The communicator 220 includes, for example, an antenna, an RF circuit, and a baseband circuit. The communicator 220 may be, for example, an interface that performs communication in accordance with IEEE802.11, and more specifically, performs communication in accordance with Wi-Fi. However, the communicator 220 may be a communication interface that performs wireless communication of another method, or may be a communication interface that performs wired connection.

The storage 230 is a work area of the processor 210 and stores various information. The storage 230 can be realized by various types of memories, and the memory may be a semiconductor memory, a register, a magnetic storage device, or an optical storage device.

The storage 230 may store a shared address book and a non-shared personal address book. FIG. 4 to FIG. 6 are examples of information stored in the storage 230. FIG. 4 to FIG. 6 are information stored in the storage of the electronic apparatus. For example, in a case where the electronic apparatus is the image forming apparatus 100, the storage 130 may store these pieces of information.

FIG. 4 is an example of the shared address book. The shared address book is a collection of address information shared by a plurality of users. For example, the shared address book may be information that can be referenced to by all employees of a company or the like where the image forming apparatus 100 is displaced. However, as described later, a range of the shared address book, which can be referenced, may differ depending on user's authority. Alternatively, as described later, there may be a plurality of address books as the shared address book, and the address books that can be referred to may differ depending on user's authority.

The shared address book may be table data containing items such as "ID", "user", "name". "telephone number", "fax number", "mail address", and "address". One record included in the shared address book, which is table data, is hereinafter referred to as shared address information. The shared address information is a collection of values in each item illustrated in FIG. 4. However, the items included in the shared address book are not limited to the example in FIG. 4, and some items may be deleted and other items may be added. In addition, the shared address book is not limited to the table data, and may be data in any other format.

The "ID" is information that uniquely identifies the shared address information. The value of the "ID" is, for example, unique numeric data, but data in other form that can uniquely identify the shared address information may be used.

The "user" is information that identifies a user who can use target shared address information. The shared address information is information shared by a plurality of users as described above, and therefore the value of the "user" is information indicating that fact. For example, the value of the "user" in the shared address book may be text data "share".

The "name" is the name of a target entity. An entity herein may be a company, may be other organization, or may be an individual. The value of the "name" may be text data representing the name of the entity, for example, "AA Trading".

The "telephone number" is information that represents the telephone number of a target entity, and is data in which a plurality of numbers are listed. The "fax number" is information representing the facsimile number of a target entity, and is data in which a plurality of numbers are listed.

The "mail address" is information that represents the mail address of a target entity. The valued of the "mail address" includes, for example, @ in the middle and is data in which a plurality of numbers or alphabets are listed.

The "address" is information that represents the address and whereabouts of a target entity. The value of the "address" may be text data that identifies, for example, a state name, a city name, a town name, a street number, and the like.

FIG. 5A is an example of a personal address book of a user A, and FIG. 5B is an example of a personal address book of a user B. Thus, the personal address book includes a first personal address book associated with a first user, and a second personal address book associated with a second user. The first user is, for example, the user A, and the first personal address book is, for example, the address book illustrated in FIG. 5A. The second user is, for example, the user B, and the second personal address book is, for example, the address book illustrated in FIG. 5B. The first personal address book can be used by the first user, but not by other users including the second user. The second personal address book can be used by the second user, but not by other users including the first user. However, this does not prevent the setting of a user who has the authority capable of referring to other users' personal address book, such as an administrator of an organization.

For example, users belonging to an organization add information such as customers acquired on the job, so that the personal address book is created and updated. For example, in a case where each user acquires information on a new customer, he or she can add a new personal address to his/her own personal address book by inputting the information to the display 140 of the image forming apparatus 100 by use of an operation acceptor (not illustrated). Therefore, the personal address book becomes different information for each user.

The items in the personal address book may be table data containing, for example, "ID", "user", "name", "telephone number", "fax number", "mail address", and "address", similar to those in the shared address book. One record included in the personal address book, which is table data, is hereinafter referred to as personal address information. The personal address information is a collection of values in each item illustrated in FIG. 5A and FIG. 5B. However, the items included in the personal address book are not limited to those in FIG. 5A and FIG. 5B, and some items may be deleted and other items may be added. In addition, it is not prohibited that the items of the shared address book and the items of the personal address book are different.

As illustrated in FIG. 5A and FIG. 5B, the "ID" is information that uniquely identifies the personal address information. The "ID" may be, for example, numeric data that is unique in the shared address book and in all users' personal address books. Alternatively, the "ID" only needs to be unique within a given personal address book and may be allowed to overlap with the "ID" in other users' personal address book.

The "user" in the personal address book is information that identifies a user corresponding to the target personal address information. For example, the value of the "user" in the personal address book of the user A may be data identifying the user A, and the value of the "user" in the personal address book of the user B may be data identifying the user B.

The "name", the "telephone number", the "fax number", the "mail address", and the "address" are the same as those in the shared address book described above using FIG. 4. FIG. 5A and FIG. 5B each illustrate an example in which the entity in the personal address book is an individual. For example, a customer company (corporation) may be managed by a shared address book, and an individual person in charge belonging to the customer company may be managed by the personal address book of each user. However, what kind of address information is stored in the shared address book and the personal address book is arbitrary, and a specific method is not limited to this.

As illustrated in FIG. 5A and FIG. 5B, the format of the values in the given items in the personal address book may differ for each user. For example, both a surname and a first name may be used in the value of the "name", as illustrated in FIG. 5A, and a combination of a surname and title may be used, as illustrated in FIG. 5B. In addition, the value of the "name" can be modified in various manners, such as a combination of a name and a position, and a combination of a name, a first name, and a position. Thus, depending on each user who uses the personal address book, the values of some items for the same entity may differ.

By using the shared address book and the personal address books illustrated in FIG. 4 to FIG. 5B, it becomes possible to improve convenience when using the image forming apparatus 100. For example, in a case where a facsimile is transmitted to a specific customer, or in a case where image data acquired by scanning is sent to a customer's mail address, the user can identify the fax number or the mail address on the basis of the address book, and therefore the burden of input is reduced.

FIG. 6 is an example of authentication data. As mentioned above, in order to properly manage the personal address books, it is necessary to identify users who use the personal address books. For the identification, it is desirable to perform an authentication process such as a login process when displaying the personal address book. The authentication data is information used in the authentication process.

The authentication data includes items such as "user ID", "user name", "password", and "contact destination". The "user ID" is information that uniquely identifies a user, such as unique numeric data.

The "user name" is text data representing the name of a user, and is information in the same format as the value of the "user" in a personal address book, for example.

The "password" is information that each user inputs when using his/her own personal address book, and is, for example, information set by the user himself/herself. The "password" is a collection of, for example, numbers, alphabets, symbols, and the like.

The "contact destination" is, for example, the mail address of each user. The mail address herein may be used, for example, as information for determining the destination of the e-mail in a change notification task described later.

2. Change Content Sharing of Personal Address Book

In a method of this embodiment, in a case where the first user updates and inputs first address information included in the first personal address book, the processor of the electronic apparatus determines whether or not corresponding address information corresponding to the first address information is included in the second personal address book. Furthermore, in a case where the corresponding address information is included in the second personal address book, the processor performs a notification process for asking the second user whether or not update of the corresponding address information is permitted. In a case where the permission response is made to the notification process, the corresponding address information included in the second personal address book is updated. The first address information and the corresponding address information herein each correspond to the personal address information described above. For example, the first address information is any address information included in the first personal address book. In addition, the first address information is, in a narrow sense, information that represents an address different from the address of the first user. For example, the first address information represents the address of a third party that is different from both the first user and the second user. The third party herein is, for example, an external entity that does not belong to the organization to which the first user and the second user belong. The third party is, for example, a customer that the first user is in charge of, and may be an organization such as a company, or may be an individual.

Further, the method of this embodiment can be applied to an information processing method for processing a personal address book. The information processing method includes determining whether or not the corresponding address information corresponding to the first address information is included in the second personal address book in a case where the first user updates and inputs the first address information included in the first personal address book, performing a notification process for asking the second user whether or not update of the corresponding address information is permitted in a case where the corresponding address book information is included in the second personal address book, and updating the corresponding address information included in the second personal address book in a case where the permission response is made to the notification process.

According to the method of this embodiment, in a case where the personal address book itself is not shared with other user, it becomes possible to share the changed contents of the personal address book with an other user. For example, in a case where an address change due to moving of a customer is found, when one person in the organization changes the personal address book, the change is reflected to other user who registers the same customer in the personal address book. As a result, it is possible to reduce the user's burden of change work.

This process targets personal address books rather than the shared address book, and therefore there is a high probability that each user actually uses the address information included in his/her own personal address books. For example, an entity included in a personal address book of a certain user is a customer with whom the user has a direct professional relationship. Therefore, it is possible to appropriately determine whether or not the change of other user is reflected in his/her own personal address book, and it is possible to ensure the accuracy of the address book.

For example, the processor of the electronic apparatus may execute each of an address book display task, a change notification task, a Web process task, and a change approval task, in order to realize the above process. The flow of the process will be described in detail below using a concrete example. As described above, an example in which the electronic apparatus is the server system 200 will be hereinafter described.

<Address Book Display Task>

Figure 7:
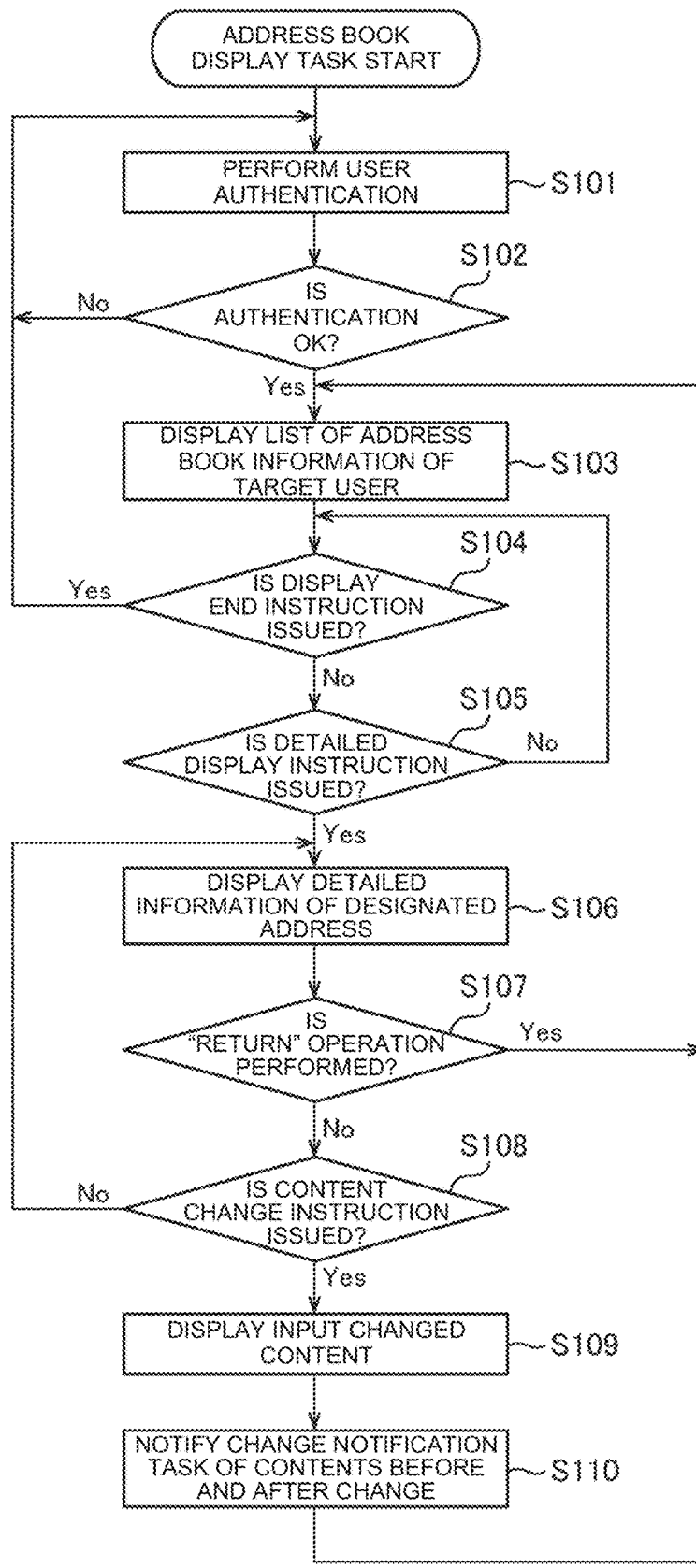
FIG. 7 is a flowchart illustrating an address book display task.

FIG. 7 is a flowchart illustrating the address book display task. The address book display task is a task of displaying, on the display 140, an address book that can be viewed by a member of an organization, for example, in a case where the member in the organization operates the image forming apparatus 100. The user may use his/her own terminal device 300 to view and change the address book. For example, by using application software for the image forming apparatus 100 installed on the terminal device 300, the user can refer to the shared address book and the personal address book associated with the image forming apparatus 100. In this case, the image forming apparatus 100 and each unit of the image forming apparatus 100 in the following description can be replaced with the terminal device 300 and each unit of the terminal device 300.

First, in Step S101, the processor 210 performs a user authentication process. For example, the processor 210 performs a process for displaying, on the display 140 of the image forming apparatus 100, an image which requests the input of a user ID and a password. The processor 210 may generate the image itself and transmit the image to the image forming apparatus 100, or may transmit information for image generation to the image forming apparatus 100 and transmit the image to the processor 110 of the image forming apparatus 100. Alternatively, the image forming apparatus 100 may acquire only necessary data from the server system 200 in advance, and the processor 110 of the image forming apparatus 100 may generate an image and the display 140 may execute the display process. The display process is the same as Step S102 and subsequent steps, and the processor 210 may perform the process, the processor 210 and the processor 110 may perform the distributed process, or the processor 110 may perform the process. The image forming apparatus 100 acquires the input user ID and password using the image. The processor 210 acquires the user ID and the password from the image forming apparatus 100 and compares the acquired user ID and password with the authentication data illustrated in FIG. 6.

In Step S102, the processor 210 determines whether the authentication is properly performed. In a case where the acquired user ID and password match any record in the authentication data, the processor 210 determines that the authentication is OK. In this case, the processor 210 identifies which user logs in by using the "user ID" or the "user name" of the matching record. In addition, the processor 210 determines that the authentication is NG in a case where the acquired user ID and password do not match any records in the authentication data.

In a case where the authentication is NG (No in Step S102), the processor 210 returns to Step S101 and user authentication is performed again.

In a case where the authentication is OK (Yes in Step S102), the processor 210 performs a process for listing and displaying the authenticated user's address book on the display 140 in Step S103.

FIG. 8 is an example of information used in the display process of Step S103 in a case where the user A is authenticated, for example. As illustrated in FIG. 8, the address book presented to the user A may be a collection of a shared address book and the personal address book of the user A. Thus, it is possible to appropriately present the address book that the user A is authorized to view. Herein, the address book of the user A is illustrated as an example. However, the same applies to other users such as the user B, and the shared address book and the authenticated user's personal address book are objects to be displayed. The information including the "ID" and the "user" is also illustrated in FIG. 8, but the "ID" and the "user" may be excluded from the target of the display process since the "ID" and the "user" are items for management. In addition, although FIG. 8 illustrates an example of a list sorted by the order of ID, sorting by other items such as the user name may be performed in the display process. In a case where user operation for selecting an item is accepted, a process of re-sorting with the selected item may be executed.

While the list is displayed, the processor 210 determines whether or not a display end instruction is issued in step S104. For example, a display end button (not illustrated) is displayed on a list display screen, and the processor 110 of the image forming apparatus 100 determines whether or not the display end button is pressed. In a case where the display end button is pressed, the image forming apparatus 100 transmits, to the server system 200, information indicating that the display end button is pressed. In a case where the processor 210 receives the information indicating that the display end button is pressed, the processor 210 determines that a display end instruction is given (Yes in Step S104), and the process returns to Step S101.

In a case where no display end instruction is issued (No in Step S104), the processor 210 determines whether or not a detailed display instruction is issued in Step S105. For example, each address information included in the list display screen is individually selectable, and the processor 110 of the image forming apparatus 100 determines which or none of the address information is selected. The image forming apparatus 100 transmits the determination result to the server system 200.

In a case where no address information is selected, the processor 210 determines that no detailed display instruction is issued (No in Step S105), and returns to step S104. That is, list display continues.

In a case where any address information is selected, the processor 210 identifies the selected address information as a designated address and determines that a detailed display instruction for the designated address is issued. This case results in Yes in Step S105, and the processor 210 displays the detailed information of the designated address on the display 140 of the image forming apparatus 100 in Step S106.

Various details of a detailed display screen are conceivable. For example, it may be a screen on which the designated address is displayed and other address information is not displayed. However, the detailed display screen may be any screen on which the designated address is displayed in more detail than the list display screen. For example, the detailed display screen may be a screen with a relatively large area for displaying the designated address, may be a screen with a relatively large number of items to be displayed, or may be any other screen.

While the details are displayed, the processor 210 determines whether or not a return button is operated in Step S107. The specific process is the same as operation detection of a display end button in Step S104, for example. In a case where the return button is operated (Yes in Step S107), the processor 210 returns to Step S103. That is, the screen is returned from the detailed display to the list display.

In a case where the return button is not operated (No in Step S107), the processor 210 determines whether or not a content change instruction is issued in Step S108. For example, a value of each item of the designated address included in the detailed display screen can be selected and rewritten. For example, in a case where operation for selecting a change confirmation button included in the detailed display screen is performed while the value is rewritten, the image forming apparatus 100 may transmit a fact that a content change instruction is issued and the changed contents to the server system 200.

The changed contents herein are, for example, a set of a changed item and a value after the change. The changed contents may be a set of a changed item, a value before the change, and a value after the change. In addition, the change is not limited to one item, and values of a plurality of items may be changed at the same time.

FIG. 9 is a diagram illustrating an example in which a part of the personal address book of the user A is changed by the user A, and a part with colored background represents a changed portion. When FIG. 8 is compared with FIG. 9, values of the "telephone number", the "fax number" and the "address" are changed for the address information of "ID"=202. The "telephone number" is "34-5678" before the change and "66-7890" after the change. The "fax number" is "34-5000" before the change and "66-7000" after the change. The "address" is "5-5, ZZ Town, XX City" before the change and "6-3, ZZ Town, XX City" after the change. The changed contents are information that identifies these. In addition, the changed contents may also include values for items that are not changed, such as the "name" and the "mail address".

In a case where the content change instruction is not issued (No in Step S108), the processor 210 returns to Step S106. That is, the detailed display continues. In a case where the content change instruction is issued (Yes in Step S108), the processor 210 performs control for displaying the changed contents on the display 140 of the image forming apparatus 100 in Step S109.

The processor 110 performs a process for notifying the change notification task of the changed contents in Step S110 in order to reflect the changed contents input by user A in the personal address books of other users. After the process of Step S110, the process returns to Step S103.

<Change Notice Task>

Figure 10:
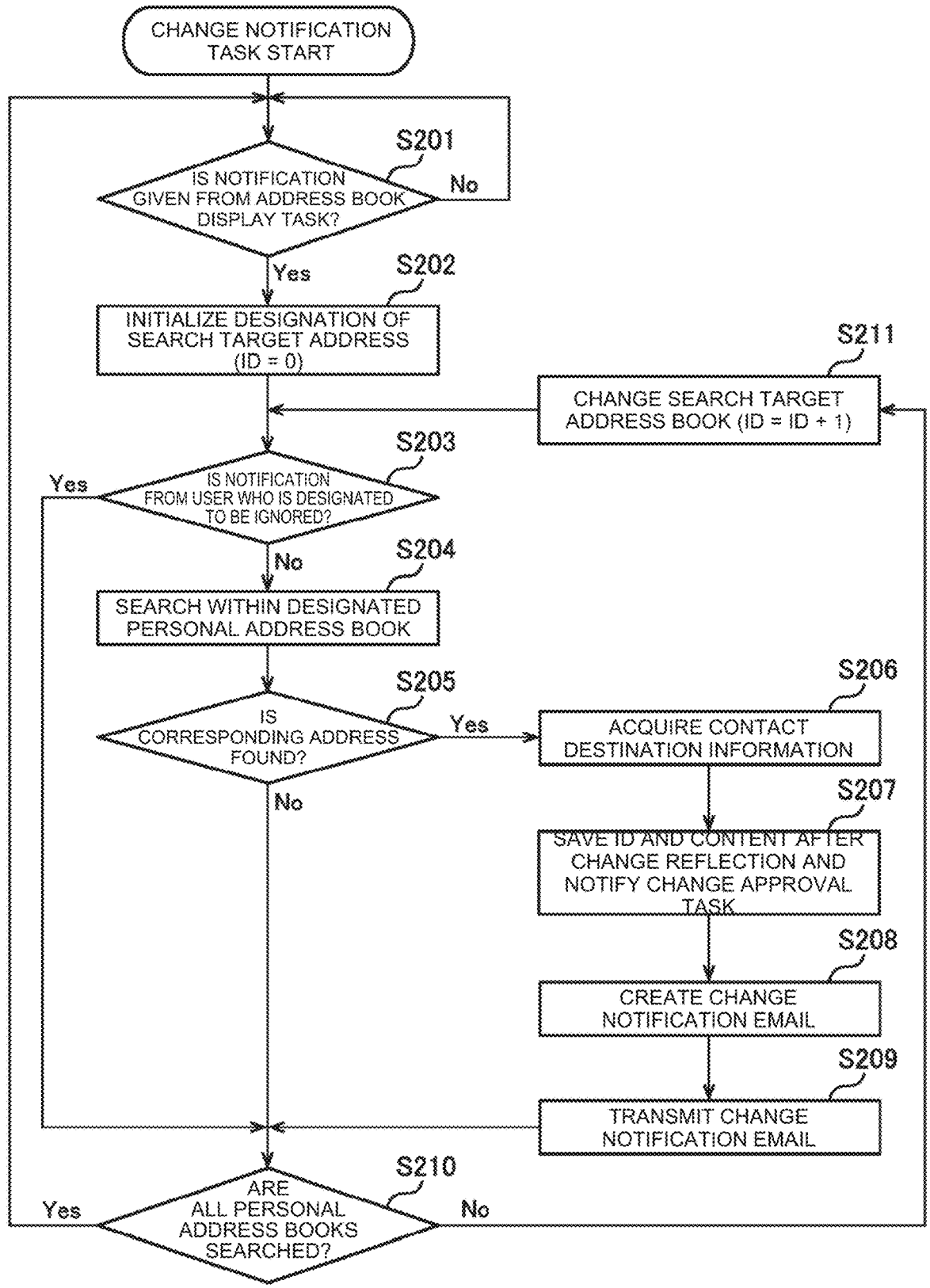
FIG. 10 is a flowchart illustrating a change notification task.

FIG. 10 is a flowchart illustrating the change notification task. The change notification task is a task for notifying other members of the changed contents in a case where one of the members of the organization changes the personal address book, for example. Hereinafter, for convenience of explanation, the user who changes the personal address book is also referred to as a change source user. In the example of FIG. 9, the user A is a change source user. In addition, the user who is a target of a reflection process of the changed contents by the change source user is also referred to as a change destination user. In the following, an example in which the process in each step in the change notification task is executed by the processor 210 of the server system 200 will be described. However, at least one or some of the following processes may be executed by the processor 110 of the image forming apparatus 100. For example, the image forming apparatus 100 may acquire only necessary data in advance from the server system 200, execute the processes described below in the processor 110 and the communicator 120, and notify the processor 210 of the server system 200 of an execution result.

First, in Step S201, the processor 210 determines whether notification is given from the address book display task. Specifically, the processor 210 determines that notification is given in a case where the process of Step S110 in FIG. 7 is executed.

In a case where no notification from the address book display task is given, no change to be shared within the organization occurs. Accordingly, the processor 210 determines No in Step S201 and executes the process of Step S201 again. That is, in the change notification task, the processor 210 waits until the notification from the address book display task is given.

In a case where the notification from the address book display task is given (Yes in Step S201), the processor 210 initializes designation of a search target address book. The search target address book is a personal address book that is a target of determination as to whether or not it is necessary to reflect the changed contents, and is any of the personal address books of users other than the change source user. That is, the user of the search target address book is a change destination user.

In Step S203, the processor 210 determines whether the notification from the address book display task is due to change operation of a user who is designated to be ignored. For example, in a case where the user A and the user B are in different departments or work places, and the relationship is weak, even when the user A changes the personal address book, the user B may think that it is not necessary to notify himself/herself. In this case, the user B ignores the user A. The ignore designation will be described with reference to FIG. 15D, FIG. 16A, FIG. 16B, and the like.

For example, the processor 210 determines whether the change destination user designates to ignore the change source user. In a case where the change source user is designated to be ignored (Yes in Step S203), notification regarding a current search target address book is unnecessary, and therefore the processes of Steps S204 to S209 are skipped and the process proceeds to Step S210.

In a case where the change source user is not designated to be ignored (No in Step S203), the processor 210 searches corresponding address information corresponding to the personal address information changed by the change source user, with the designated search target address book as a target, in Step S204. The corresponding address information herein is personal address information that is presumed to be the same entity as changed personal address information.

FIG. 11 is a diagram illustrating a search process for corresponding address information. As described above using FIG. 9, an example in which the user A changes the address information of "ID"=202 is considered herein. Accordingly, the processor 210 sequentially designates personal address books of users other than the user A as search target address books. For example, in a case where the personal address book of the user is the search target address book, it is determined whether each personal address information of "ID"=301-308 belongs to the same customer as the personal address information of "ID"=202.

For example, the processor 210 sets a value before change of the personal address information of "ID"=202 as a comparison source. Then, for each item other than the "ID" and the "user", it is determined whether the values of comparison source matches the value of each personal address information of the search target address book. The reason why the "ID" and the "user" are excluded is that the "ID" and the "user" are items for management, and there is possibility that the values may not match even the same entity. For example, the processor 210 determines that the personal address information is corresponding address information when the values of a predetermined number or more items among the items to be compared match.

In the example of FIG. 11, a portion with colored background represents the matched items, and 4 items, namely, the "telephone number", the "fax number", the "mail address", and the "address" in the personal address information of "ID"=302 match those of the comparison source. Therefore, the processor 210 determines that the address with "ID"=302 is the corresponding address information.

There are cases where there are different customers with the same surname and the same name, or where a plurality of customers belong to the same company and have the same address. Therefore, even in a case where entities are different, values of some items may match. Therefore, it is desirable that the predetermined number in the above determination is two or more. In addition, as illustrated in FIG. 11, even when the entities are the same, there may be items that do not match, such as the formats of the "name" being different. Therefore, the above predetermined number may be a value smaller than the total number of items to be compared.

In Step S205, the processor 210 determines whether the corresponding address information is found by the search process. In a case where the corresponding address information is not found (No in Step S205), no notification is necessary because the changed contents do not need to be reflected to a designated search target address book. Therefore, the processes of Steps S206 to S209 are skipped and the process proceeds to Step S210.

In a case where the corresponding address information is found (Yes in Step S205), the processor 210 acquires the contact destination of the user associated with the designated search target address book, in Step S206. For example, the processor 210 may compare the value of the "user" in the search target address book with the value of the "user name" in the authentication data of FIG. 6. For example, when the search target address book is the personal address book of the user B, the contact destination information is mail address "qqq@nnn" illustrated in FIG. 6. The "user" in each personal address book is information representing a user ID, and the contact destination may be identified using the user ID.

In Step S207, the processor 210 notifies the change approval task of the user ID of the change destination user, and the contents after change. Thus, in the change approval task, it is possible to appropriately manage the changed contents to be notified to the change destination.

In Step S208, the processor 210 creates a mail for notifying the change destination user of the changed contents. FIG. 12 is an example of a mail created in Step S208. As illustrated in FIG. 12, the destination of the mail is the change destination user corresponding to the personal address book where the corresponding address information is found, and the mail address is the information identified in Step S206. The mail may also include information identifying the change source user and the contents before and after the change.

In this embodiment, the change destination user may be able to determine what to do with this mail. For example, each user selects any of a permission response to accept the change, a withholding response to withhold the change, a rejection response to reject the change, and an ignoring designation response to ignore future notification from the same user without reflecting any change. Therefore, a mail may include four objects representing the responses. For example, "OK" in FIG. 12 corresponds to a permission response, "withhold" corresponds to a withholding response, "unnecessary" corresponds to a rejection response, "ignore from now on" corresponds to an ignoring designation response.

The four objects may include respective links to different URLs (Uniform Resource Locators). That is, notification of changed contents is performed by a mail, and a response of each change destination user in response to the e-mail may be performed using a Web browser or the like. However, the method of this embodiment is not limited to this, and at least one of the notification of changed contents and the response of each change destination user may be performed using dedicated application software.

In Step S209, the processor 210 performs a process for transmitting the mail created in Step S208. Specifically, the electronic apparatus includes a communicator that communicates with the terminal device 300 used by the second user. The communicator is, for example, the communicator 220 of the server system 200. The processor 210 executes, as the notification process, a process for causing the communicator 220 to transmit, to the terminal device 300 of the second user, information representing that the update is performed, on the basis of contact destination information representing the contact destination of the second user. Consequently, it is possible to properly notify a user having corresponding address information in his/her personal address book of changed contents.

For example, by the process of Step S209, the mail illustrated in FIG. 12 is transmitted to the user B. The user B receives the mail on his/her terminal device 300 and responds to the notification by selecting any of the above four objects.

In a case of Yes in Step S203 or No in Step S205, or after the process of Step S209, the processor 210 determines whether a process for all personal address books is completed in Step S210. In a case where there is an unprocessed personal address book (No in Step S210), the processor 210 changes the search target address book in Step S211, and thereafter the process returns to Step S203. That is, a different user is set as the change destination user, and the above processes for the personal address book of the change destination user are repeated. Therefore, a single content change made by a given change source user may be notified to a plurality of change destination users.

In addition, a process for all personal address books is completed (Yes in Step S210), the processor 210 ends a process based on one notification from the address book display task and the process returns to Step S201. That is, the processor 210 waits until next notification from the address book display task, and executes the process in a case where the next notification is received.

<Web Process Task and Change Approval Task>

Figure 13:
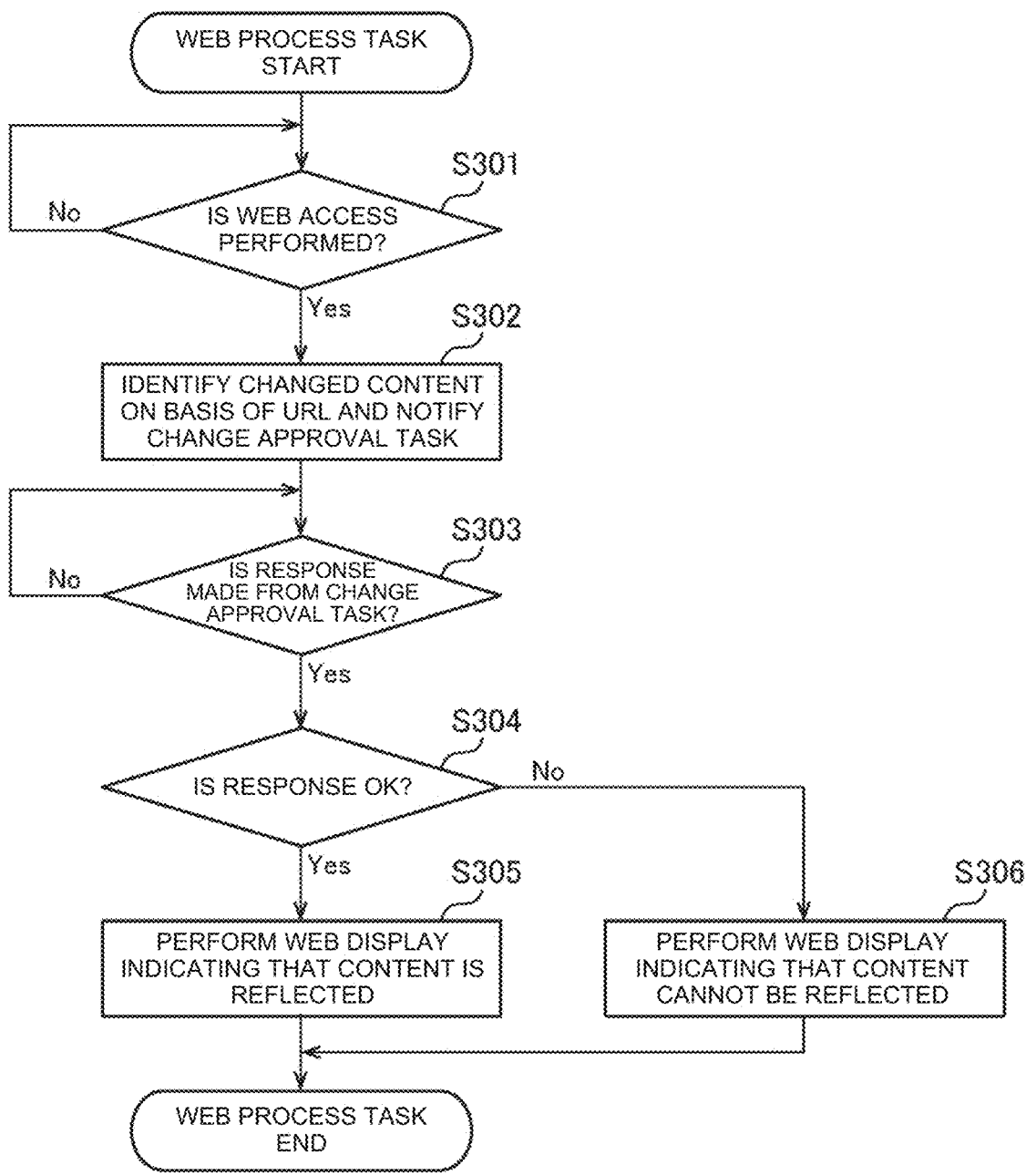
FIG. 13 is a flowchart illustrating a Web process task.
Figure 14:
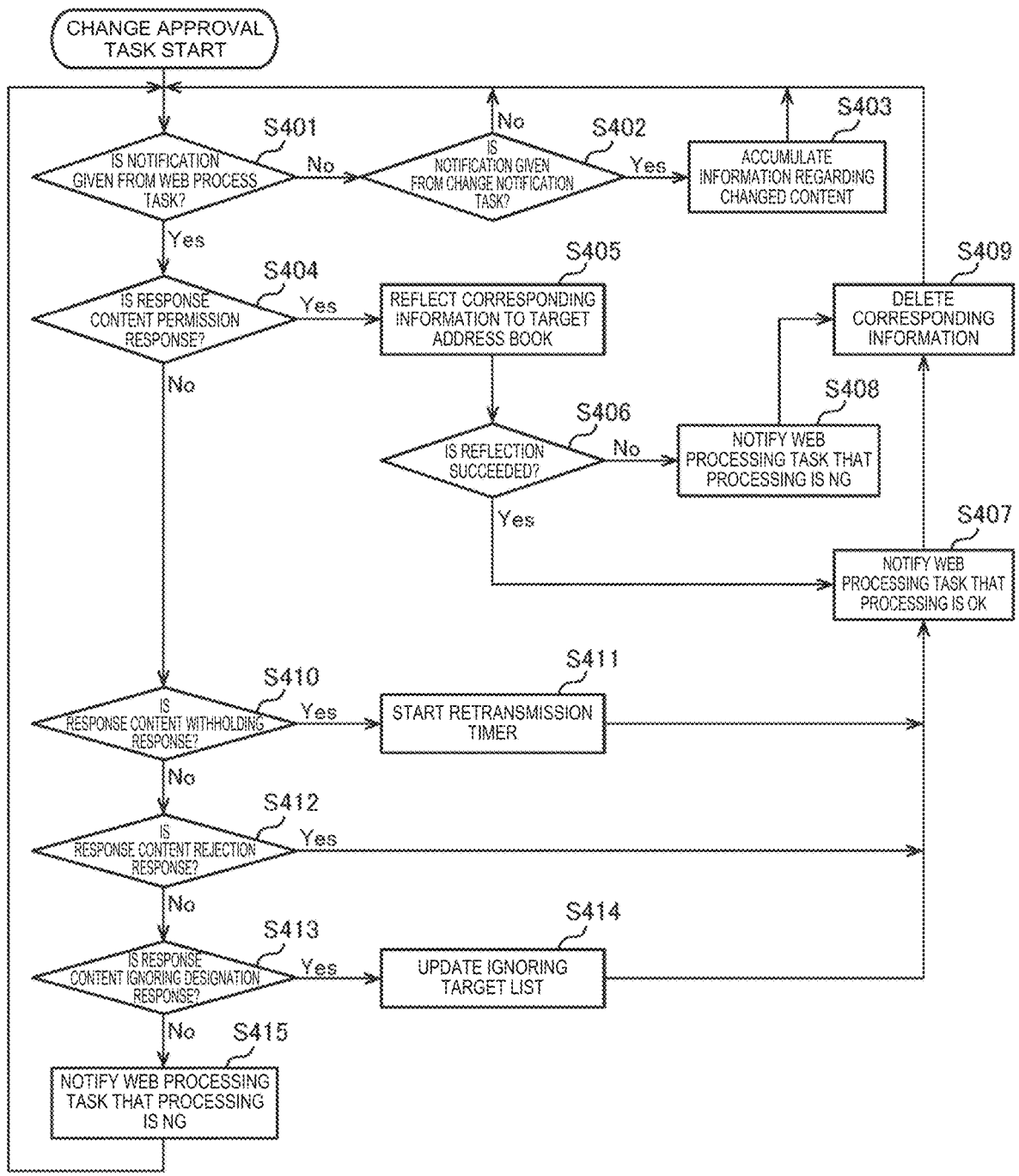
FIG. 14 is a flowchart illustrating a change approval task.

FIG. 13 is a flowchart illustrating the Web process task, and FIG. 14 is a flowchart illustrating the change approval task. In the Web process task, a process for acquiring a response of the change destination user to the changed content notification process on the Web, and a process for notifying the change destination user of the processing result of the server system 200 based on the response on the Web are performed. In the change approval task, a process according to the content of the response of the change destination user acquired by the Web process task is performed. In the following, an example in which a process of each step in the Web process task and the change approval task is executed in the processor 210 of the server system 200 will be described. However, the processor 110 of the image forming apparatus 100 may execute at least one or some of the processes in the Web process task and the change approval task described below.

First, the Web process task in FIG. 13 will be described. In Step S301, the processor 210 determines whether Web access is performed. For example, the server system 200 functions as a Web server and accepts access to URLs corresponding to the four objects illustrated in FIG. 12. That is, "there is Web access" means that the change destination user who receives the notification mail selects any of the objects.

In a case where there is no Web access (No in Step S301), the processor 210 returns to Step S301. In other words, the processor 210 waits until the Web access is performed.

In a case where there is no Web access (Yes in Step S301), the processor 210 identifies the changed contents on the basis of an accessed URL in Step S302. The processor 210 notifies the change approval task of the identified changed contents. For example, the URL herein may be different depending on the changed contents and the response selected by the change destination user. Thus, the processor 210 can appropriately identify and notify what kind of changed content is notified and how the change destination user responds to the notification, on the basis of the URL.

In Step S303, the processor 210 determines whether there is a response from the change approval task to the notification of Step S302. In a case where there is no response (No in Step S303), the processor 210 returns to Step S303. In other words, the processor 210 waits until a response from the change approval task is made after the notification of Step S302.

In a case where there is the response (Yes in Step S303), the processor 210 determines whether there is a response indicating that the process is OK from the change approval task, in Step S304. In a case of a response of OK (Yes in Step S304), the processor 210 displays, on the Web, the fact that the response of the user is properly reflected, in Step S305. In a case of a response of NG (No in Step S304), the processor 210 displays, on the Web, the fact that the response of the user is not reflected properly, in Step S306. A specific example of Steps S304 to S306 will be described together with the description of the change approval task in FIG. 14.

The change approval task in FIG. 14 will be described. First, the processor 210 determines whether there is a notification from the Web process task, in Step S401. The notification herein is the notification of Step S302 in FIG. 13.

In a case where there is no notification (No in Step S401), the processor 210 determines whether there is a notification from the change notification task, in Step S402. The notification herein is the notification of Step S207 in FIG. 10. In a case where there is the notification from the change notification task (Yes in Step S402), the processor 210 stores information representing the changed content in the storage 230 in Step S403. As described above, information identifying the change destination user and a specific changed content and the like are notified in Step S207. By the process of Step S403, the processor 210 can accumulate and manage the changed content notified to the change destination user.

In a case where there is no notification from the change notification task (No in Step S402), or after the process of Step S403, the process returns to Step S401.

In a case where there is a notification from the Web process task (Yes in Step S401), the processor 210 branches the process in accordance with the content of the response from the change destination user. First, in Step S404, the processor 210 determines whether the content of the response is the permission response.

In a case where the content is the permission response (Yes in Step S404), the processor 210 performs a process for reflecting the changed content to the target personal address book in Step S405. For example, in a case where the corresponding address information is an address of "ID"=302 included in the personal address book of the user B as in FIG. 11, the processor 210 tries to change the "telephone number", the "fax number", and the "address" of the corresponding address information in the same manner as in FIG. 9.

In Step S406, the processor 210 determines whether the change reflection in Step S405 is succeeded. In a case where the change reflection is succeeded (Yes in Step S406), the processor 210 notifies the Web process task that processing is OK, in Step S407.

Consequently, Steps S303 and S304 in FIG. 13 are determined as Yes. In this case, the changed content by the user A is also reflected to the personal address book of the user B, and therefore the processor 210 may, for example, display, on the web, the fact that personal address book of the user B is changed and the contents before and after the change, in Step S305.

FIG. 15A is an example of a screen displayed in this case. For example, in a case where an "OK" object in the mail illustrated in FIG. 12 is operated, the terminal device 300 of the user B starts a Web browser and accesses the URL corresponding to the selected object. Then, the server system 200 which is a Web server performs a process for displaying the screen illustrated in FIG. 15A on the Web browser running on the terminal device 300. Thus, in a case where the user B selects the "OK" which is an object representing the permission response, it is notified that the personal address book of the user B is properly changed.

On the other hand, in a case where change reflection in Step S405 is failed (No in Step S406), the processor 210 notifies the Web process task that the process is NG in Step S408. Consequently, Step S303 in FIG. 13 is determined as Yes, and Step S304 is determined as No. In this case, although the user B permits the reflection of the changed contents by the user A, the reflection is failed. Accordingly, in Step S305, the processor 210 may display, for example, text such as "update of the personal address book is failed" on the Web.

After the process of Step S407 or Step S408, the processor 210 deletes the corresponding information from the storage 230 in Step S409. In the above example, information representing that the changed contents illustrated in FIG. 9 is reflected to the personal address book of the user B among the information stored in the storage 230 by the process of Step S403 is deleted. By the process of Step S409, a response is obtained from the change destination user, and the information processed for this response is deleted. As a result, information for which an appropriate response is not yet obtained from the destination user remains in the storage 230, and therefore unprocessed information can be managed appropriately. After the process of Step S409, the processor 210 returns to Step S401 and continues the process.

In a case where the response content of the user notified from the Web process task is not the permission response (No in Step S404), the processor 210 determines whether the response content is the withholding response, in Step S410.

In a case where the response content is the withholding response (Yes in Step S410), the processor 210 starts a retransmission timer in Step S411. After the process of Step S411, the processor 210 proceeds to Step S407, and notifies the Web process task that the process is OK.

Consequently, Steps S303 and S304 in FIG. 13 are determined as Yes. In this case, the changed content by user A is not reflected immediately. After a predetermined time is elapsed by the retransmission timer, a mail similar to that in FIG. 12 is transmitted again. Therefore, in Step S305, the processor 210 may display, on the Web, indication to contact again after a predetermined time, for example.

FIG. 15B is an example of a screen displayed in this case. The screen illustrated in FIG. 15B includes indication to contact again after a predetermined time, and changed contents. Thus, the change destination user can be notified that the withholding response by the change destination user is appropriately transmitted to the server system 200, and that the determination as to whether or not to change is withheld for a predetermined time.

In a case where the withholding response is performed, the processor 210 deletes the corresponding information in Step S409 after the process of Step S407. In a case where the retransmission timer determines that the predetermined time is elapsed, for example, the change notification task may execute the processes of Steps S207 to S209 in FIG. 10 again. Thus, it is possible to send the notification of information representing the changed content to the change approval task again and transmit a mail to the change destination user again.

In a case where the response content of the user notified from the Web process task is not the withholding response (No in Step S410), the processor 210 determines whether the response content is the rejection response representing that the change is unnecessary, in Step S412.

In a case where the response content is the rejection response (Yes in Step S412), the processor 210 proceeds to Step S407, and notifies the Web process task that the process is OK.

Consequently, Steps S303 and S304 in FIG. 13 are determined as Yes. In this case, the changed contents by the user A is not reflected to the personal address book of user B. Accordingly, in Step S305, the processor 210 may display, on the Web, for example, the address of "ID"=302 maintains the state before the change.

FIG. 15C is an example of a screen displayed in this case. The screen illustrated in FIG. 15C includes indication to maintain the content of the personal address book, and a specific value. Thus, the change destination user can be notified that the rejection response by the change destination user is properly transmitted to the server system 200 and the personal address book is maintained unchanged.

In a case where the response content by the user notified from the Web process task is not the rejection response (No in Step S412), the processor 210 determines whether the response content is the ignoring designation response, in Step S413.

In the case where the response content is the ignoring designation response (Yes in Step S413), the processor 210 updates the ignoring target list in Step S414. FIG. 16A and FIG. 16B are each an example of the ignoring target list. The ignoring target list may include, for example, a change source user, a change destination user, and a user ID representing the change destination user. The change source user in the ignoring target list is designated to be ignored from the change destination user.

In the state of FIG. 16A, for all change destination users, the "change source user" is "none". That is, all users are not set any user to be ignored. On the other hand, in a case where the user B designates to ignore the user A, the ignoring target list is updated as illustrated in FIG. 16B. Specifically, the user A is added to the "change source user" of a record in which the user B is the "change destination user".

In the process of Step S203 described using FIG. 10, determination is performed using this ignoring target list. The processor 210 reads the record of a user corresponding to the search target address book from the ignoring target list. For example, when the personal address book of the user B is the search target address book, the second line of the ignoring target list is read. Then, the processor 210 determines whether the user who changes the personal address book is included in the value of the "change source user" in the record. In a case where the ignoring target list is updated to the status of FIG. 16b, the user A is included in the value of the "change source user", and therefore the determination result of Step S203 is Yes. As a result, the processes of the Step S204 to S209 for the personal address book of the user B is not executed, and therefore the user B is not notified of the changed content of the user A, and the changed content is not reflected to the personal address book of the user B.

Thus, after receiving, from the second user, the ignoring designation response representing that the notification process based on the first user is ignored, with respect to the notification process, the processor of the electronic apparatus excludes the second user from a target of the notification process based on update input of the first user. Consequently, it is possible to suppress the notification process which has low necessity, and therefore it is possible to improve convenience. Particularly, the ignoring designation response is performed by the second user herein, and therefore it is possible to increase the accuracy of the ignoring target list.

After the process of Step S414, the processor 210 proceeds to Step S407, and notifies the Web process task that the process is OK.

Consequently, Steps S303 and S304 in FIG. 13 are determined as Yes. In this case, the changed content by the user A is not reflected, and the user A is further added to an ignoring destination list of the user B. Therefore, in Step S305, the processor 210 may display the above fact on the Web.

FIG. 15D is an example of a screen displayed in this case. The screen illustrated in FIG. 15D includes indication to maintain the content of the personal address book, and a specific value, similar to FIG. 15C. Furthermore, the screen of FIG. 15D includes text indicating that the change by the user A is not notified and is not reflected. Thus, the ignoring designation response by the change destination user is properly transmitted to the server system 200, and the change destination user is notified that the personal address book is maintained, and the ignoring designation list is updated.

In a case where the response content of the user notified from the Web process task is not the ignoring designation response (No in Step S413), the processor 210 notifies the Web process task that the process is NG, in Step S415. In this case, for example, the response content from the Web process task is an unknown response to the change approval task. The change approval task cannot execute the process according to the response content, and therefore notifies that the process is NG.

Consequently, Step S303 in FIG. 13 is determined as Yes and S304 is determined as No. In this case, the processor 210 may display, on the Web, for example, text such as "an inappropriate response is made.".

3. Shared Address Book

In the above, an example in which the changed content of the personal address book is shared by a plurality of users is described. However, in this embodiment, the shared address book may be updated. However, the shared address book is data shared by the plurality of users, and therefore the impact of incorrect update is large. Therefore, the shared address book may reflect a changed content, provided that approval is obtained from an administrator with update authority.

For example, by a process similar to the address book display task illustrated in FIG. 7, the processor 210 accepts user authentication, display of a shared address book, and a changed content. For example, in a case where the authenticated user A is a user who does not have update authority for the shared address book, and a value of the "user" in the changed address information is "shared", it is determined that change request for the shared address book is made.

The processor 210 may perform a notification process to the administrator by the same process as the change notification task illustrated in FIG. 10. The shared address book is shared by a plurality of users, and therefore the search process for corresponding address information can be omitted. For example, the processor 210 transmits a mail including the change source user who changes the shared address book and the changed content to the terminal device 300 of an administrator by using contact destination information of the administrator. The mail herein may include, for example, objects corresponding to the permission response, the withholding response, and the rejection response.

The administrator determines whether or not the change request is approved on the basis of the contents of the mail, and selects any of the objects on the basis of the determination result. Subsequent processes are similar to, for example, the example of the personal address book, and determination of the response content by the Web process task, a process according to the response content by the change approval task, and notification to the administrator by the Web process task, and the like may be performed. In addition, the change source user who requests the change may be notified of the determination result of the administrator or the processing result of the change approval task.

However, the administrator who has the authority to update the shared address book may be the head of a division or a department, or a person in charge of an information management department. It is assumed that these administrators have fewer opportunities to interact directly with customers compared to an on-site person in charge who do not have update authority. As a result, even when the on-site person in charge submits an update request, it may be difficult to determine whether the update content is correct or not.

Therefore, in a case where the first user has authority to update the shared address book, and first shared address information included in the shared address book is updated and input by the first user, the processor of the electronic apparatus may perform a notification process for asking a user who has a usage history of the first shared address information whether or not updating is permitted, and may notify an administration user who has the authority to update the shared address book of a response by the user who has the user history.

FIG. 17 is another example for describing a data configuration of the shared address book. As illustrated in FIG. 17, in addition to the items illustrated in FIG. 4, the shared address book may include an "administrator" and "used history".

The "administrator" is information for identifying the user who has the authority to update the target shared address information. In the example of FIG. 17, the administrator of the shared address information of "ID"=101 is a user P, and the administrator of the shared address information of "ID"=102 to 104 is a user Q.

The "used history" is information that identifies a user who has a history in which the target shared address information is used within a predetermined period of time. The length of the predetermined period of time is, for example, a period of several months, but may be shorter or longer.

The use herein may be, for example, transmission of a facsimile by use of the facsimile function of the image forming apparatus 100 with the value of the "fax number" as the destination. Alternatively, the use herein may be, for example, transmission of acquired image data by use of the scanning function of the image forming apparatus 100 via the communicator 120 with the value of the "mail address" as the destination. In either case, the function of the image forming apparatus 100 is used, and therefore the processor 110 of the image forming apparatus 100 can identify a user who uses the shared address, and use timing on the basis of a user authentication result and an operation history of a logged-in user. However, the use herein may include other aspects such as detailed display of the target shared address information in the address book display task. In addition, manual input of the usage history is not prevented.

In the example of FIG. 17, the shared address information of "ID"=101 has a history of being used by the user A. The shared address information of "ID"=102 has a history of being used by the user B and a user C. The shared address information of "ID"=103 has a history of being used by the user A and the user B. The shared address information of "ID"=104 has a history of being used by the user D.

In a case where operation for changing the shared address information of "ID"=102 is performed by the user A, the processor 210 transmits a mail including the changed content of the shared address information to the respective terminal devices 300 of the user B and the user C on the basis of the contact destination information of the user B and the contact destination information of the user C.

The user B and the user C have a usage history of the target shared address, and therefore are considered to be closely related to the "BB construction". For example, the user B and the user C are persons in charge of the "BB construction". Therefore, there is a high probability that it is possible to accurately determine whether or not the changed content of the shared address by the user A is valid.

The processor 210 acquires the response of the user B and the response of the user C by the same process as that of the Web process task, and notifies the user Q who is the administrator of the responses together with the changed content. The user Q himself/herself may not be familiar with the "BB construction", but as described above, the response of the user B and the response of the user C are highly reliable. Therefore, according to the method of this embodiment, determination by the administrator who has the authority to update the shared address book is facilitated, and therefore it is possible to reduce the burden on the administrator and improve the accuracy of the shared address book.

4. Modification Some modifications will be described below.

4.1 Disclosure Range of Changed Content (Shared Range)

In the above description, as illustrated in Step S203 of FIG. 10, an example in which the notification process is not performed in a case where the change source user is designated to be ignored from the change destination user is indicated. In other words, the personal address books of all users who are not designated to be ignored may be searched for corresponding address information. However, the shared range of the changed content may be able to be set by the change source user.

For example, the processor of the electronic apparatus performs a process for identifying the target range of the notification process on the basis of the setting input by the first user, and in a case where the second user is not included in the target range, the process may skip the notification process.

FIG. 18 is another example of the personal address book of the user A. As illustrated in FIG. 18, the personal address book may include the "shared range" in addition of the items illustrated in FIG. 5A. The shared range herein is information that identifies a part or all of an organization. For example, in a case where there is a hierarchical structure, namely, department-division-section within a company, the value representing the shared range takes values such as "in office", "in department", "in division", "in section", and so on. However, the composition of the organization is not limited to this, and the specific values can be modified in various manner.

For example, the storage 230 may store information that associates a user in an organization with belonging department, a belonging division, a belonging section, and the like of the user. The processor 210 can identify a group of users in the same department as the change source user, a group of users in the same division as the change source user, a group of users in the same section as the change source user, and the like, on the bias of this information.

For example, in the address book display task, the processor 210 performs a process for identifying the change source user and the "shared range" of the personal address information whose change is confirmed, and notifies the change notification task of the processing result. In the change notification task, the processor 210 identifies the user group included in the shared range on the basis of the notified information, and determines whether the change destination user is included in the user group. The processor 210 may execute Step S204 and the subsequent processes in a case where the change destination user is included in the user group, and the processor 210 may skip the processes of Steps S204 to S209 in a case where the change destination user is not included in the user group.

Thus, it is possible to set the range of disclosure notification of the changed content, and therefore, for example, it is possible to manage information appropriately, such as by narrowing the shared range for information to be kept confidential. In FIG. 18, an example in which information related to the shared range is included in the items of the personal address book. However, the shared range may be set using other information.

The shared range may be set on the basis of the shared address book. The shared address book is information shared by a plurality of users as described above, but is not limited to one in which all shared address information is shared by all users. For example, a shared address book different for each user attribute, such as for each division or position may be used. The different shared address book may be implemented as different table data. Alternatively, the shared address book itself is one table data, and by extracting a part or all of the shared address books according to the user's attributes at the time of use, a shared address book different according to the attributes may be presented. Various modifications of a specific data format can be made.

The processor of the electronic apparatus performs a process for identifying the target range of the notification process on the basis of the shared address book used by the first user, and in a case where the second user is not included in the target range, the processor may skip the notification process.

For example, the storage 230 may store information in which a user in the organization is associated with the shared address book used by the user. The processor 210 can identify a group of users who use the same shared address book as the change source user on the basis of this information.

For example, in the address book display task, the processor 210 notifies the change notification task of the change source user. In the change notification task, the processor 210 identifies a user group that uses the same shared address book as the change source user on the basis of the notified information, and determines whether the change destination user is included in the user group. The processor 210 may execute Step S204 and the subsequent processes in a case where the change destination user is included in the user group, and the processor 210 may skip the processes of Steps S204 to S209 in a case where the change destination user is not included in the user group.

Thus, it is possible to set the range of the disclosure notification of the changed content. Furthermore, the range can be determined on the basis of the shared address book, and therefore it becomes possible to efficiently execute a process in a case where both the shared address book and the personal address book are used.

4.2 Notification Process

In the above, as illustrated in FIG. 10 and FIG. 12, an example in which the notification process to the change destination user is performed using mail is described. However, the form of the notification process is not limited to this.

For example, in a case where the display operation of the second personal address book is performed by the second user, the processor of the electronic apparatus executes, as the notification process, a process for displaying, on the display, a notification screen for asking whether or not update of the corresponding address information is permitted. The notification screen is displayed, for example, on the display 140 of the image forming apparatus 100.

For example, the processor 210 may omit the processes of Steps S206, S208 and S209 in the change notification task of FIG. 10. In this case, the notification process by mail is omitted. In addition to the process of Step S207, the processor 210 may notify a second change notification task (not illustrated) of information for identifying the change destination user and the changed content.

For example, in a case where Step S105 of FIG. 7 is determined as Yes, the address book display task may notify the second change notification task of information for identifying the user logged into the image forming apparatus 100 and the address book information for which detailed display is to be performed.

That is, the second change notification task accumulates the information in which the change destination user is associated with the corresponding address information, and acquires the information in which the user who logs in to the image forming apparatus 100 is associated with the personal address information of the detailed display target. Therefore, in the second change notification task, the processor 210 determines whether the user who logs in to the image forming apparatus 100 and the personal address information of the detailed display target match the change destination user and the corresponding address information.

FIG. 19 is a diagram illustrating a process in the second change notification task. For example, it is assumed that the change illustrated in FIG. 9 is made by the user A as described above, and it is stored that the user B is the change destination user and the personal address information of "ID"=302 is the corresponding address information by the same procedure as in FIG. 11. Then, at a later timing than the above, the user B logs in to the image forming apparatus 100, so that data illustrated in FIG. 19 is identified as information for displaying the address book of the user B, and furthermore, the personal address information of "ID"=302 is selected as the detailed display target.

In this case, the change destination user and the log-in user match, and the corresponding address information and the address information of detailed display target match. Therefore, the processor 210 displays the information for identifying the change source user who changes the address and the notification screen including the contents before and after the change on the display 140 of the image forming apparatus 100. The notification screen may include four objects representing the above responses. The image forming apparatus 100 transmits, for example, the selection result of the object by the change destination user to the server system 200.

Thus, the change destination user can be notified of the changed content by the change source user by using the display 140. Particularly, in a case where the detailed display of the corresponding address information is used as a trigger for the notification process, in a situation where the corresponding address information may be used for facsimile transmission, scan data transmission, or the like, the changed content can be presented appropriately. In addition, network load can be reduced because there is no need to transmit a mail.

The conditions for displaying the notification screen on the display 140 are not limited to the above examples. For example, the notification screen illustrated in FIG. 19 may be displayed when a user registered as the change destination user logs in to the image forming apparatus 100, or at other times.

In the above, an example in which the notification process on the notification screen instead of the notification process is performed by mail is illustrated. However, both the notification process by mail and the notification process on the notification screen may be used.

For example, the processor 210 may first execute the notification process by mail by executing the change notification task illustrated in FIG. 10, and in a case where the withholding response is performed as a response to the notification by the change destination user, the second change notification task may be executed. For example, the change destination user receives a mail by his/her terminal device 300, makes the withholding response to this mail, and thereafter moves to the image forming apparatus 100 to perform login operation or detailed display operation. Thus, a destination user can respond flexibly because different types of notification processes are realized. For example, when it is easy to determine whether to reflect the change, a permission or reject response is made to the mail. It is possible to suspend those for which it is difficult to make determine, and then to determine the response until the corresponding address information is actually used.

4.3 Approval Response of Reliable User

In the above, the permission response, the withholding response, the rejection response, and the ignoring designation response as the responses of the change destination user to the notification process are described. However, the responses that the change destination user can input are not limited to the above.

Contrary to the example of the ignoring designation response, there are cases where the change source user and the change destination user have deep relationship. For example, it is conceivable that the change source user and the change destination user belong to the same division and are in charge of the same customer. For example, in a case where the user A and the user C are in the same division and business contents are similar, change made by the user A is considered highly reliable for the user C. The user C has a high probability of making the permission response to the notification that the user A is the change source user. In such a case, when the user C is notified of the change made by the user A every time, the user C may feel troublesome.

Therefore, after receiving, from the second user, the approval designation response indicating that the first user is approved with respect to the notification process, the processor may execute an update process of the second personal address book without performing the notification process to the second user based on update input of the first user.

FIG. 20A and FIG. 20B are each an example of the approval target list. The approval target list may include, for example, a change source user, a change destination user, and a user ID representing the change destination user. The change source user in the approval target list indicates that the change destination user is approved and designated as a reliable user.

In the state of FIG. 20A, for all change destination users, the "change source user" is "none". That is, all users are not set any user to be relied. Therefore, in a case where a changed content is reflected, each user needs to receive a notification process and perform a permission response. On the other hand, in a case where the user C designates to approve the user A, the approval target list is updated as illustrated in FIG. 20B. Specifically, the user A is added to the "change source user" of a record in which the user C is the "change destination user".

In this case, the processor 210 reads the record of a user corresponding to the search target address book from the approval target list. For example, when the personal address book of the user C is the search target address book, the third line of the approval target list is read. Then, the processor 210 determines whether the user who changes the personal address book is included in the value of the "change source user" in the record. After the approval target list is updated to the state illustrate in FIG. 20B, the user A is included in the value of the "change source user".

In this case, the processor 210, for example, skips Steps S204 to S209 and then executes a reflection process illustrated in Step S405 of FIG. 14. Thus, change made by the approved user is reflected without the notification process, and therefore it is possible to improve user convenience.

4.4 Timing Designation

In the above, in the change notification task illustrated in FIG. 10, a specific process including mail transmission and the like is performed with the receipt of the notification from the address book display task as a trigger (Yes in Step S201). Therefore, in a case where the change source user issues a content change instruction in Step S108 (Yes in Step S108 of FIG. 7), it is assumed that the notification process is executed immediately. However, the method of this embodiment is not limited to this.

For example, the processor of the electronic apparatus may perform the notification process at the timing designated by the timing designation in a case where the update input including the timing designation is provided by the first user.

For example, it is assumed that a customer plans to move and finds out that the address of the customer will be changed to a new address on October 1st. In this case, the previous address is used until September 30th, and therefore it is not preferable to immediately reflect the content of the address change even when the address change is known. On the other hand, it is inconvenient that the changed content cannot be input until October 1st. In such a case, the change source user may designate October 1st and then perform operation for updating the personal address information corresponding to the above customer.

The processor 210 may determine whether to exceeds the timing designated by the timing designation by the change source user instead of Step S201 of FIG. 10, for example. Alternatively, the processor 210 may perform a part of the change notification task in FIG. 10, for example, search for the corresponding address information and compose a mail before October 1st, and transmit the composed mail on or after October 1st. Thus, after the changed content is registered in advance, it is possible to flexibly adjust the timing of sharing the changed content. The processor 210 may also perform a process for reflecting change to the personal address book of the change source user on a condition that the designated timing has passed.

Also, in a case where the data in the personal address book is changed, the data before the change may be deleted. However, in a case where the changed content is incorrect, or in a case where the above timing designation is incorrect earlier than actual timing designation, there is a possibility that a desire to restore the data before the change.

Therefore, the processor 210 may save the old data before update to the storage 230 in a case where given personal address information is updated. For example, the processor 210 may rollback the personal address information using the old data in a case where the processor 210 determines that the user issues a rollback instruction. Alternatively, the processor 210 may write both updated information after update and information before update on the list display screen or the detailed display screen of the address book.

4.5 Change by Service Person etc.

In a case where municipalities are merged or changed, it becomes necessary to change the "address" of all entities that have an address or residency in the municipalities. Thus, in a case where change occurs for a large amount of address information, each person in charge individually executes the change operation, and therefore the burden on the user may increase.

Therefore, in this embodiment, a special user, such as a specific administrator or service person, who has the authority to make collective change may be set. The processor 210 executes the change notification task for all personal address books stored in the storage 230 in a case where a content change instruction is issued from the user who has the authority to make collective change. For example, in a case where a municipality name before change and a municipality name after change are input, the processor 210 selects all personal address books including the municipality name before change as target address information. Also, the change target herein may include the shared address book. Thus, even in a case where a large amount of address information can be changed, the user's burden can be reduced.

In this case, the processor 210 may execute a notification process using mail or the like. It is possible that the name change of a municipality may be reflected only in a part of a target area, and therefore it is possible for each user to determine whether the change is appropriate or not by performing the notification process.

4.6 Information Processing System

Figure 21:
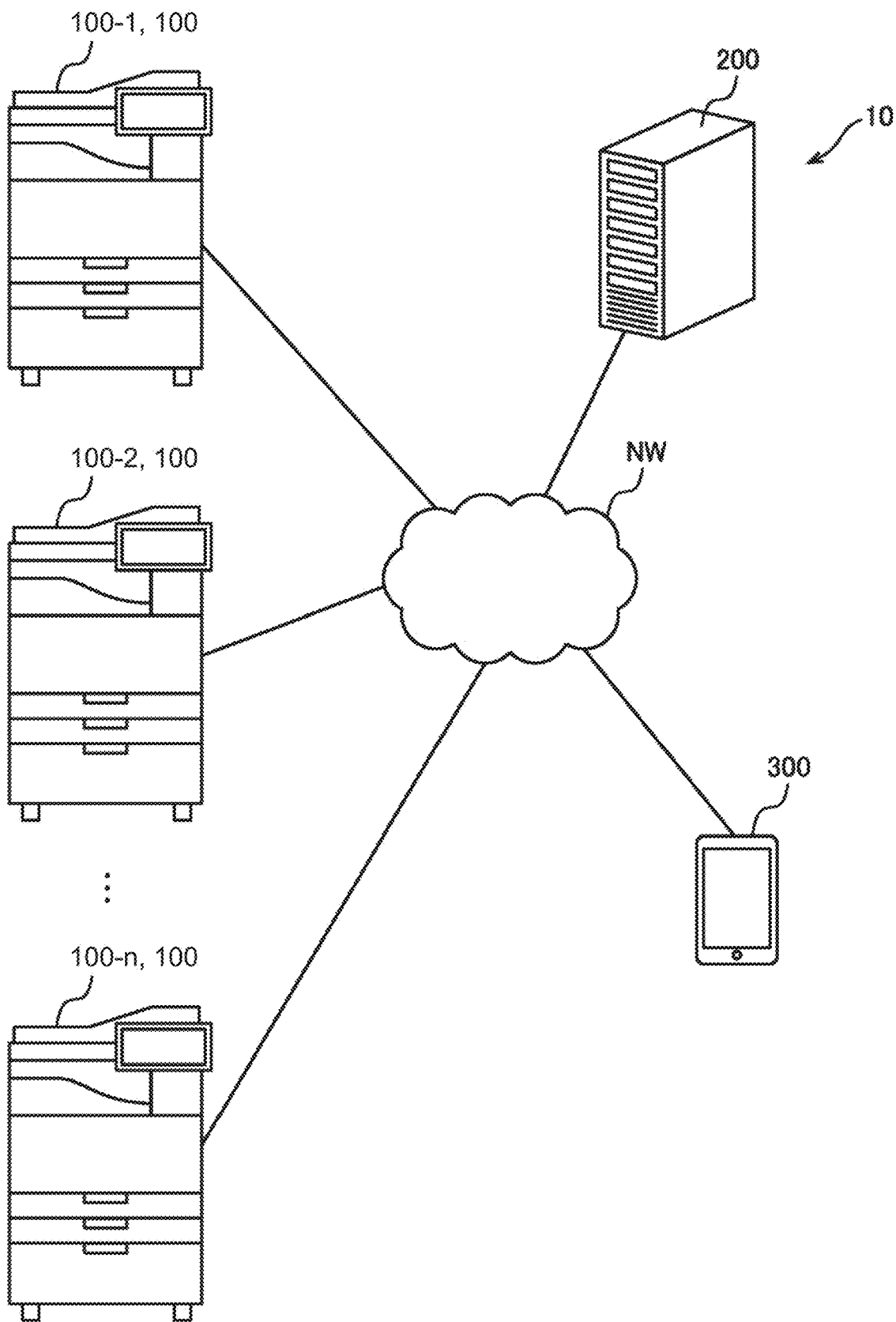
FIG. 21 is a configuration example of an information processing system.

FIG. 21 is another configuration example of the information processing system 10 including the electronic apparatus. As illustrated in FIG. 21, the information processing system 10 may include a plurality of the image forming apparatuses 100. The plurality of image forming apparatuses 100 are, for example, an image forming apparatus 100-1, an image a forming apparatus 100-2, . . . , and an image forming apparatus 100-n. Herein, n is an integer greater than or equal to 2. The plurality of image forming apparatuses 100 are each connected to the network NW. Alternatively, the plurality of image forming apparatuses 100 may be hierarchically connected. For example, among the plurality of image forming apparatuses 100, the image forming apparatus 100, which is a cordless extension unit, may be connected to the network NW via another image forming apparatus 100, which is a base unit. A server system 200 and a terminal device 300 are similar to those in FIG. 1.

Thus, an information processing system 10 may include a first image forming apparatus, a second image forming apparatus, the server system 200 that executes a process to a personal address book. The first image forming apparatus and the second image forming apparatus herein are, for example, an MFP (multifunction peripheral). The first image forming apparatus is, for example, the image forming apparatus 100-1, and the second image forming apparatus is, for example, the image forming apparatus 100-2.

In a case where a first user updates and inputs first address information included in a first personal address book in the first image forming apparatus, the server system 200 determines whether or not corresponding address information corresponding to the first address information is included in a second personal address book. In a case where the corresponding address information is included in the second personal address book, the server system 200 performs a notification process for asking a second user whether or not update of the corresponding address information is permitted. In a case where the permission response is made to the notification process, the corresponding address information included in the second personal address book is updated.

Furthermore, the server system 200 transmits the second personal address book after the update to the second image forming apparatus.

A specific process in the server system 200 is described above. Thus, in the information processing system 10 including the plurality of image forming apparatuses 100, it is possible to appropriately reflect the changed content input using any image forming apparatus 100 in the personal address book of another user, and to share the changed content with the image forming apparatus 100 different from the image forming apparatus 100 used for the change. That is, in a case where the plurality of image forming apparatuses 100 are used as illustrated in FIG. 21, even when a user in an organization uses any of the image forming apparatuses 100, it is possible to appropriately use latest address book information.

4.7 Background

As described above using FIG. 7 to FIG. 9, the display of the address book, the input of change, and the like are performed using, for example, the display 140 of the image forming apparatus 100. On the other hand, the display process for reflecting the changed content in the personal address books of other users is performed using a mailer or a Web browser in the terminal device 300 of the change destination user, as described above using FIG. 10 to FIG. 16B.

That is, the display displays a screen for update used for update input, and does not display a screen related to the notification process, and a screen related to the response result of the second user to the notification process. The display herein is the display 140 of the image forming apparatus 100, but may be a display (not illustrated) included in the server system 200. Thus, for example, in a case where the user A changes the personal address book, a process for sharing this change with other user is executed in the background for the user A. That is, the sharing process of the changed content does not interfere with operation by the change source user, and therefore it is possible to improve convenience.

Although this embodiment has been described in detail as described above, those skilled in the art easily understand that many variations are possible that do not substantially deviate from the novelties and effects of this embodiment. Therefore, all such variations are intended to be included within the scope of the present disclosure. For example, a term that appears in the specification or drawings at least once with a different, broader or synonymous term can be replaced by the different term anywhere in the specification or drawings. All combinations of this embodiment and modifications are also included within the scope of the present disclosure. In addition, the configurations and the operation of the electronic apparatus, the image forming apparatus (MFP), the server system, the terminal device, the information processing system, and the like are not limited to those described in this embodiment, and various modifications are possible. While there have been described what are at present considered to be certain embodiments of the invention, it will be understood that various modifications may be made thereto, and it is intended that the appended claims cover all such modifications as fall within the true spirit and scope of the invention.

What is claimed is:

1. An electronic apparatus comprising:
a storage that stores a personal address book; and
a processor, wherein the personal address book includes a first personal address book associated with a first user, and a second personal address book associated with a second user, in a case where the first user updates and inputs first address information included in the first personal address book, the processor determines whether or not corresponding address information corresponding to the first address information is included in the second personal address book, and in a case where the corresponding address information is included in the second personal address book, the processor performs a notification process for asking the second user whether or not update of the corresponding address information is permitted, and in a case where a permission response is made to the notification process, the corresponding address information included in the second personal address book is updated.

2. The electronic apparatus according to claim 1, wherein the storage stores a shared address book, and in a case where the first user does not have authority to update the shared address book, and first shared address information included in the shared address book is updated and input by the first user, the processor asks a user who has a usage history of the first shared address information whether or not update is permitted, and notifies an administration user who has the authority to update the shared address book of a response by the user who has the user history.

3. The electronic apparatus according to claim 2, wherein in a case where the processor performs a process for identifying a target range of the notification process on the basis of the shared address book used by the first user, and where the second user is not included in the target range, the processor skips the notification process.

4. The electronic apparatus according to claim 1, further comprising
a display, wherein
in a case where the second user performs display operation of the second personal address book, the processor executes, as the notification process, a process for displaying, on the display, a notification screen for asking whether or not update of the corresponding address information is permitted.

5. The electronic apparatus according to claim 1, comprising
a communicator that communicates with a terminal device used by the second user, wherein
the processor executes, as the notification process, a process for causing the communicator to transmit, to the terminal device of the second user, information representing that the update is performed, on the basis of contact destination information representing a contact destination of the second user.

6. The electronic apparatus according to claim 1, wherein, after receiving, from the second user, an ignoring designation response representing that the notification process based on the first user is ignored, with respect to the notification process, the processor excludes the second user from a target of the notification process based on update input of the first user.

7. The electronic apparatus according to claim 1, wherein after receiving, from the second user, an approval designation response indicating that the first user is approved with respect to the notification process, the processor executes an update process of the second personal address book without performing the notification process to the second user based on update input of the first user.

8. The electronic apparatus according to claim 1, wherein the processor performs a process for identifying a target range of the notification process on the basis of setting input by the first user, and in a case where the second user is not included in the target range, the processor skips the notification process.

9. An information processing system comprising:
a first image forming apparatus;
a second image forming apparatus; and
a server system that executes a process for a personal address book, wherein
the personal address book includes a first personal address book associated with a first user, and a second personal address book associated with a second user,
in a case where the first user updates and inputs first address information included in the first personal address book in the first image forming apparatus, the server system determines whether or not corresponding address information corresponding to the first address information is included in the second personal address book, and
in a case where the corresponding address information is included in the second personal address book, the server system performs a notification process for asking the second user whether or not update of the corresponding address information is permitted, and in a case where a permission response is made to the notification process, the corresponding address information included in the second personal address book is updated, and the server system transmits the second personal address book after update, to the second image forming apparatus.

10. An information processing method for performing a process to a personal address book, the personal address book including a first personal address book associated with a first user, and a second personal address book associated with a second user, the information processing method comprising:
determining whether or not corresponding address information corresponding to first address information is included in the second personal address book in a case where the first user updates and inputs the first address information included in the first personal address book; and
performing a notification process for asking the second user whether or not update of the corresponding address information is permitted in a case where the corresponding address information is included in the second personal address book, and updating the corresponding address information included in the second personal address book in a case where a permission response is made to the notification process.

* * * * *